(12) United States Patent
Geng et al.

(10) Patent No.: US 12,442,972 B2
(45) Date of Patent: Oct. 14, 2025

(54) DISPLAY MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Shixin Geng, Beijing (CN); Yu Zhang, Beijing (CN); Bochang Wang, Beijing (CN); Huiyan Li, Beijing (CN); Zhuolong Li, Beijing (CN); Miao Liu, Beijing (CN); Xuefei Qin, Beijing (CN); Lulu Wang, Beijing (CN)

(73) Assignees: Beijing BOE Display Technology Co., Ltd, Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/017,987

(22) PCT Filed: Apr. 20, 2022

(86) PCT No.: PCT/CN2022/088015
§ 371 (c)(1),
(2) Date: Jan. 25, 2023

(87) PCT Pub. No.: WO2023/201593
PCT Pub. Date: Oct. 26, 2023

(65) Prior Publication Data
US 2024/0272348 A1    Aug. 15, 2024

(51) Int. Cl.
*G02B 6/10*    (2006.01)
*F21V 8/00*    (2006.01)
*G09G 3/32*    (2016.01)

(52) U.S. Cl.
CPC ......... *G02B 6/0073* (2013.01); *G02B 6/0083* (2013.01); *G09G 3/32* (2013.01)

(58) Field of Classification Search
CPC .. G02B 6/0073; G02B 6/0083; G02B 6/0093; G02F 1/133317; G02F 2201/54
See application file for complete search history.

(56) References Cited

U.S. PATENT DOCUMENTS 8,467,010 B2 *   6/2013   Shang .................. G02B 6/0088
                                                 362/633
8,740,445 B2 *   6/2014   Lee .................. G02F 1/133608
                                                 362/609

(Continued)

FOREIGN PATENT DOCUMENTS

CN    201548778 U    8/2010
CN    102384442 A    3/2012

(Continued)

*Primary Examiner* — Rhonda S Peace
(74) *Attorney, Agent, or Firm* — HOUTTEMAN LAW LLC

(57) ABSTRACT

The present disclosure provides a display module and a display apparatus. The display module includes a display panel, a backlight assembly, an intermediate frame and a backplane; the backplane includes a backplane body on a side of the backlight assembly away from the display panel; the backplane body includes a contact structure recessed in a direction from a side away from the light guide assembly toward a side close to the light guide assembly. The contact structure is in contact with the light guide assembly; a receiving space is between the backplane body and the light guide assembly and on a side of the contact structure close to a lateral backlight source; an elastic contact member is in a receiving space and is in contact with the backplane body and is adjacent to the light guide assembly; the intermediate frame includes an intermediate frame body surrounding the backlight assembly.

20 Claims, 8 Drawing Sheets

(56) References Cited

U.S. PATENT DOCUMENTS

| | | | |
|---|---|---|---|
| 9,958,716 B2* | 5/2018 | Matsumoto | G02B 6/0088 |
| 11,249,346 B2* | 2/2022 | Huang | G02F 1/133608 |
| 2012/0287672 A1 | 11/2012 | Lee | |
| 2018/0157093 A1* | 6/2018 | Jang | H05K 1/144 |
| 2024/0272348 A1* | 8/2024 | Geng | G02B 6/0088 |

FOREIGN PATENT DOCUMENTS

| | | |
|---|---|---|
| CN | 102402051 A | 4/2012 |
| CN | 102588899 A | 7/2012 |
| CN | 202472185 U | 10/2012 |
| CN | 102830515 A | 12/2012 |
| CN | 103235436 A | 8/2013 |
| CN | 103591559 A | 2/2014 |
| CN | 103672602 A | 3/2014 |
| CN | 103901654 A | 7/2014 |
| CN | 203718526 U | 7/2014 |
| CN | 203965758 U | 11/2014 |
| CN | 104344281 A | 2/2015 |
| CN | 204372713 U | 6/2015 |
| CN | 204477814 U | 7/2015 |
| CN | 206684439 U | 11/2017 |
| CN | 207557612 U | 6/2018 |
| CN | 207924326 U | 9/2018 |
| CN | 208351214 U | 1/2019 |
| CN | 209356808 U | 9/2019 |
| CN | 211375250 U | 8/2020 |
| CN | 211554568 U | 9/2020 |
| CN | 211702213 U | 10/2020 |
| CN | 112422861 A | 2/2021 |
| CN | 112578590 A | 3/2021 |
| CN | 112987403 A | 6/2021 |
| CN | 113109967 A | 7/2021 |
| CN | 215642171 U | 1/2022 |
| CN | 215735164 U | 2/2022 |
| IN | 103499054 A | 1/2014 |
| JP | 2013229185 A | 11/2013 |
| JP | 2016110692 A | 6/2016 |
| TW | 201207502 A | 2/2012 |

\* cited by examiner

DISPLAY MODULE AND DISPLAY APPARATUS

TECHNICAL FIELD

The present disclosure relates to the field of display technology, and in particular to a display module and a display apparatus.

BACKGROUND

A liquid crystal bar (bar-shaped) screen is a novel display medium which gradually enters people's life and work recently. The liquid crystal bar screen has a wider and wider application, and has been rapidly developed in the intelligent transportation system field such as public transportation, subway and the like. Especially, a bar screen with a super-long size may be used for scenes such as advertisement serving in a station, a display for traffic guiding of the public transportation or the like, and support the use in a landscape mode and a portrait mode, thereby bringing more direct visual convenience for the masses.

However, for a display screen with a super-long size (especially a bar screen, a length of the bar screen is more than 2 m, for example), it is difficult to ensure that a light guide plate is not upwarping, so that the light guide plate and a lateral backlight source are easily misaligned with each other, and the display effect is adversely affected.

SUMMARY

The present disclosure aims to solve at least one of technical problems in the prior art, and provides a display module and a display apparatus, which can limit a light guide plate and prevent the light guide plate from upwarping, so that the alignment of the light guide plate and the lateral backlight source may be improved, and the display effect is further ensured.

In order to achieve the above object, an embodiment of the present disclosure provides a display module, including a display panel, a backplane on a side away from a light outgoing surface of the display panel, and a backlight assembly between the display panel and the backplane, wherein the backlight assembly includes a light guide assembly, the light guide assembly includes an optical film layer, a light guide plate and a reflective sheet sequentially arranged along a direction away from the display panel, and the backlight assembly further includes a lateral backlight source arranged opposite to the light guide plate; the backplane includes a backplane body on a side of the backlight assembly away from the display panel;

the backplane body includes a contact structure recessed in a direction from a side away from the light guide assembly toward a side close to the light guide assembly, and the contact structure is in contact with the light guide assembly; a receiving space is between the backplane body and the light guide assembly and on a side of the contact structure close to the lateral backlight source; an elastic contact member is in the receiving space and is in contact with the backplane body and is adjacent to the light guide assembly; and the display module further includes an intermediate frame; the intermediate frame includes an intermediate frame body surrounding the backlight assembly; the intermediate frame further includes a first limit protrusion adjacent to a surface of the light guide assembly close to the display panel; and the first limit protrusion coordinates with the elastic contact member to limit the light guide plate.

In an embodiment, the first limit protrusion is adjacent to the surface of the light guide plate close to the display panel and on a side of the light guide plate close to the lateral backlight source; and the intermediate frame further includes a first extension between the display panel and the optical film layer, and configured to support the display panel and limit the optical film layer.

In an embodiment, the backplane further includes a first backplane side edge on a side of the lateral backlight source away from the light guide plate; and a bent portion is on the first backplane side edge and extends from the first backplane side edge to a side of the lateral backlight source away from the first backplane side edge.

In an embodiment, the backplane further includes a second backplane side edge on at least one side of the display module other than the side where the lateral backlight source is distributed; and a plurality of first recesses are on a surface of the intermediate frame body opposite to each of the first and second backplane side edges in a direction perpendicular to the light outgoing surface; and a plurality of first protrusions are at an end of each of the first and second backplane side edges opposite to the intermediate frame body, and each first protrusion is in a corresponding first recess.

In an embodiment, each first recess corresponding to each first protrusion on the first backplane side edge is a blind groove; and each first recess corresponding to each first protrusion on the second backplane side edge is a through groove.

In an embodiment, the display module further includes a frame; the frame includes a frame body on a side of the first recess away from the first protrusion and extending along a direction parallel to a plane where the light outgoing surface of the display panel is located, and a frame side edge on a side of each of the first backplane side edge and the second backplane side edge away from the backlight assembly; wherein, a surface of the frame body and a surface of the intermediate frame body, which are opposite to each other, are attached to each other; and the frame side edge is fixedly connected to each of the first and second backplane side edges by fasteners.

In an embodiment, the lateral backlight source includes a printed circuit board and an LED light bar on the printed circuit board; and a plurality of second protrusions are on a side of the reflective sheet opposite to the printed circuit board and protrude toward the lateral backlight source, and are distributed at intervals along the side of the reflective sheet opposite to the lateral backlight source; and one end of each second protrusion opposite to the printed circuit board is under the LED light bar.

In an embodiment, an outer surface of each of the plurality of second protrusions is covered with an anti-reflection layer.

In an embodiment, a second recess is on a side of the reflective sheet away from the lateral backlight source, and a third protrusion is on the backplane side edge opposite to the second recess, the third protrusion is in the second recess.

In an embodiment, a profile of a projection of the backplane body on a plane where the light outgoing surface of the display panel is located is rectangular; the contact structure includes at least three contact sub-structures arranged at intervals along a direction parallel to a long side of the backplane body; the backplane body further includes a first reinforcing rib structure recessed in a direction from a side away from the light guide assembly toward a side close to the light guide assembly;

the first reinforcing rib structure includes two first reinforcing ribs and at least two second reinforcing ribs, wherein the two first reinforcing ribs are respectively arranged on two sides of the at least three contact sub-structures close to two long sides of the backplane body, and are parallel to the two long sides of the backplane body, respectively; and in each of spacing regions between every two adjacent contact sub-structures is provided one of the at least two second reinforcing ribs, and each of the second reinforcing ribs is between the two first reinforcing ribs and is parallel to a short side of the backplane body.

In an embodiment, a second reinforcing rib structure is on at least one of the contact sub-structures, and includes at least one third reinforcing rib and/or at least one fourth reinforcing rib, wherein the third reinforcing rib is parallel to the long side of the backplane body; the fourth reinforcing rib is parallel to the short side of the backplane body.

In an embodiment, a space is between each first reinforcing rib and the contact sub-structures, and a reinforcing rib plate is in the space between each first reinforcing rib and the contact sub-structures and on a side of the backplane body close to the backlight assembly.

In an embodiment, a space between one of the two first reinforcing ribs and the contact sub-structures is a first space, a space between the other of the two first reinforcing ribs and the contact sub-structures is a second space, and the first space is smaller than the second space;

a cross-sectional shape of the reinforcing rib plate in the first space in a plane perpendicular to the light outgoing surface of the display panel is L-shaped; a cross-sectional shape of the reinforcing rib plate in the second space in the plane perpendicular to the light outgoing surface of the display panel is U-shaped; and the second space is closer to the lateral backlight source than the first space.

In an embodiment, the lateral backlight source includes a printed circuit board and an LED light bar on the printed circuit board;

a projection of a light incident surface of the light guide plate on a plane where the printed circuit board is located is a first bar, and an orthographic projection of the LED light bar on the plane where the printed circuit board is located is a second bar; at room temperature, a length of the first bar is greater than that of the second bar, and both ends of the first bar are closer to outer profile lines on two sides of the display module which are oppositely arranged in an extending direction of the first bar than both ends of the second bar, respectively; and at a lowest storage temperature of the display module, the length of the first bar is greater than or equal to that of the second bar, and both ends of the second bar are not closer to the outer profile lines on the two sides of the display module oppositely arranged in the extending direction of the first bar than both ends of the first bar, respectively.

In an embodiment, a length difference D between the length of the first bar and the length of the second bar at room temperature satisfies the following relationship:

$$D \geq 1.1 \times S_{guide}$$

where $S_{guide}$ is a total contracting amount of the light guide plate contracting from two ends to the middle of the light guide plate in the extending direction of the first bar; the total contracting amount is equal to a product of a length of the light guide plate, a specified temperature difference and a thermal expansion coefficient; and the specified temperature difference is a difference between room temperature and the lowest operating temperature of the display module.

In an embodiment, the intermediate frame includes a plurality of segments sequentially stitched along a circumferential direction thereof, a space is between every two adjacent segments, and an end of a first one of the every two adjacent segments is provided with a first lapping portion extending in a direction close to a second one of the every two adjacent segments, and an end of the second one of the every two adjacent segments is provided with a second lapping portion extending in a direction close to the first one of the every two adjacent segments, and the second lapping portion overlaps the first lapping portion; and a first stitching seam is between the first lapping portion and the end of the second one of the every two adjacent segments; and a second stitching seam is between the second lapping portion and the end of the first one of the every two adjacent segments.

In an embodiment, outer profiles of the display panel and the intermediate frame are both rectangular;

the plurality of segments are six segments, wherein four segments are straight line segments, and the other two segments are fold-line segments;

wherein two of the straight line segments are on one long side of the display panel, the other two straight line segments are on the other long side of the display panel, and the two straight line segments on a same side are parallel to the long side and are stitched with each other; and each of the two fold-line segments includes one first sub-segment and two second sub-segments, wherein the first sub-segment is on a corresponding short side of the display panel and is parallel to the short side, the two second sub-segments are respectively on two long sides of the display panel and are respectively parallel to the two long sides; ends of the two second sub-segments are respectively connected to the two ends of the corresponding first sub-segment as a whole, and the other ends of the two second sub-segments are all stitched with the adjacent straight line segments.

In an embodiment, for ensuring that the backplane does not bulge due to extruding of the intermediate frame at a stitched position when the intermediate frame is thermally expanded at a high temperature, a total width of stitching seams of the intermediate frame in a long side direction satisfies the following relationship:

$$B_{total} > 0.9 \times (G1 - G2)$$

where $B_{total}$ is the total width of the stitching seams of the intermediate frame in the long side direction, and the total width of the stitching seams is equal to a sum of a width of a first stitching seam between two straight line segments in the long side direction of the intermediate frame and a width of a first stitching seam between each second sub-segment and the adjacent straight line segment; G1 is a thermal expansion amount of the intermediate frame in the long side direction during a temperature increases from room temperature to the highest operating temperature of the display module; G2 is a thermal expansion amount of the backplane in the long side direction during a temperature increases from room temperature to the highest operating temperature of the display module.

In an embodiment, for ensuring that light leakage for the intermediate frame does not occur at the stitched position when the intermediate frame is contracted at the low temperature, a minimum value of a lapping amount of each first lapping portion and the corresponding second lapping portion, of the intermediate frame in the long side direction of the intermediate frame, in the extending direction of the first lapping portion and the corresponding second lapping portion satisfies the following relationship:

$$Cmin > 1.1 \times S_{intermediate}$$

where Cmin is the minimum value of the lapping amount, which is a minimum one of a lapping amount corresponding to two straight line segments in the long side direction of the intermediate frame and a lapping amount corresponding to each second sub-segment and the adjacent straight line segment; and $S_{intermediate}$ is a contracting amount of the intermediate frame in the long side direction during a temperature is lowered from room temperature to the lowest operating temperature of the display module.

In an embodiment, the intermediate frame body includes an intermediate frame side edge on a side of each of the first backplane side edge and the second backplane side edge away from the light guide assembly; a plurality of third recesses are arranged on at least one intermediate frame side edge; a plurality of fourth recesses are arranged on one of the first backplane side edge and the second backplane side edge corresponding to the intermediate frame side edge with the third recesses; a plurality of fourth protrusions are arranged on a side of the optical film layer corresponding to the intermediate frame side edge with the third recesses.

In an embodiment, each third recess is a through groove; and the display module further includes a light shielding member on a surface of the intermediate frame side edge away from the optical film layer; an orthographic projection of the light shielding member on the intermediate frame side edge covers the third recess.

In an embodiment, a display region of the display panel has a diagonal size of greater than or equal to 48 inches and a length-width ratio of greater than or equal to 16:5.

As another technical solution, an embodiment of the present disclosure further provides a display apparatus, including the above display module of the embodiment of the present disclosure, and the display module is a bar display module.

DETAIL DESCRIPTION OF EMBODIMENTS

Figure 1:
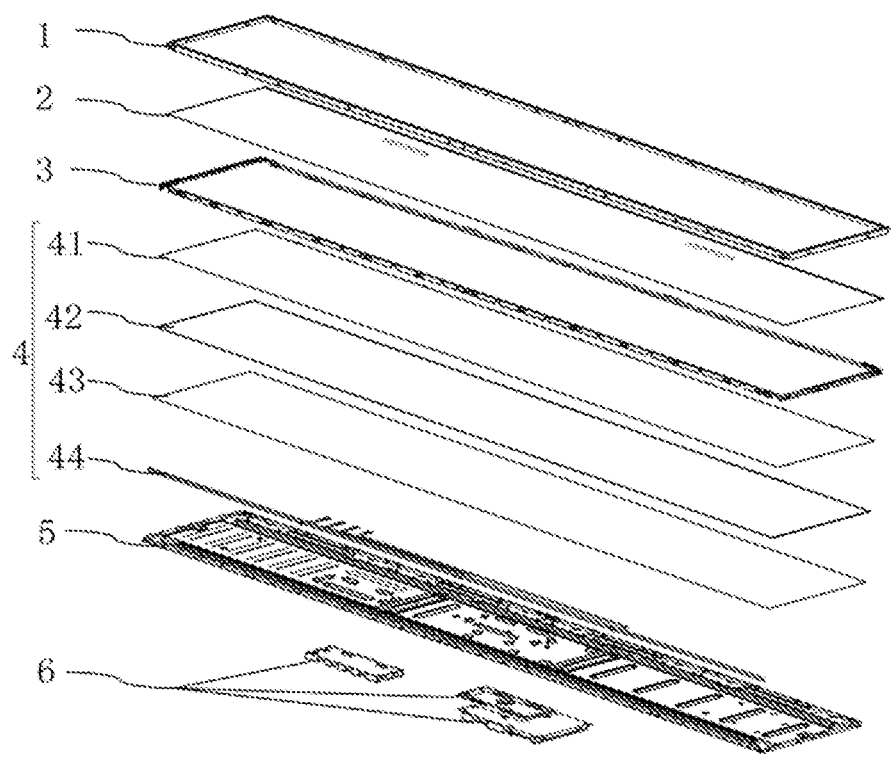
FIG. 1 is an exploded view of a structure of a display module according to an embodiment of the present disclosure.

In order to make the objects, technical solutions and advantages of the present disclosure more apparent, the present disclosure will be described in further detail with reference to the accompanying drawings. Obviously, the described embodiments are a part, not all, of embodiments in the present disclosure. All other embodiments, which may be obtained by a person skilled in the art without any creative effort based on the embodiments in the present disclosure, belong to the protection scope of the present disclosure.

Shapes and sizes of components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas of elements, but are not intended to be limiting.

Referring to FIG. 1, a display module according to the embodiment of the present disclosure includes a display panel 2, an intermediate frame 3, a backplane 5 located on a side away from a light outgoing surface of the display panel 2, and a backlight assembly located between the display panel 2 and the backplane 5. In an embodiment, the display module further includes a frame 1 and a circuit board assembly 6 (including a constant current board and a protective cover thereof, a timing controller and a protective cover thereof). The backlight assembly 4 includes a light guide assembly, which includes but is not limited to, an optical film layer 41, a light guide plate 42, and a reflective sheet 43 disposed sequentially in a direction away from the display panel 2. In addition, the backlight assembly 4 may further include a lateral backlight source 44 disposed opposite to the light guide plate 42. The term "opposite to" here may mean that the lateral backlight source 44 is arranged opposite to a light incident surface of the light guide plate 42 perpendicular to a plane where the light outgoing surface of the display panel is located. In practical applications, the optical film layer 41 may, for example, has a light-homogenizing function. The optical film layer 41 may include, for example, a plurality of optical films such as a lower diffusion film for diffusing light, a prism film for improving the brightness of light, or the like; and in an embodiment, a diffusion film or other functional films may be added.

Figure 2:
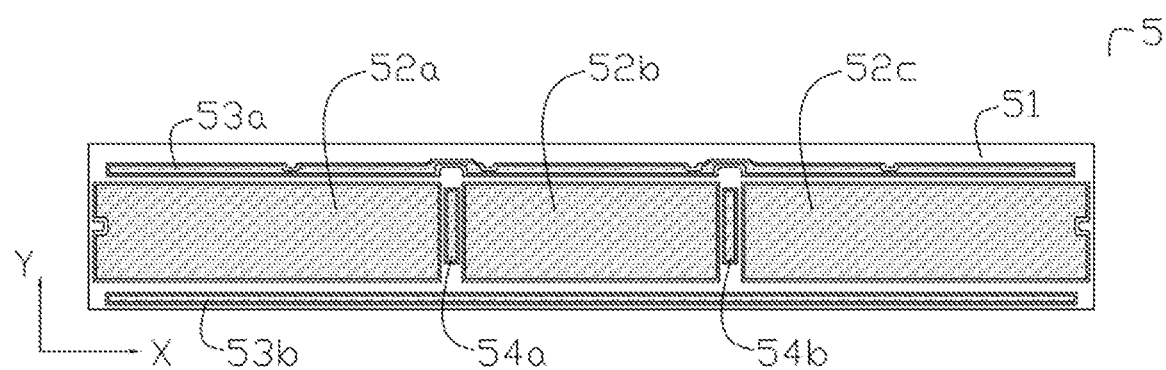
FIG. 2 is a schematic diagram of a structure of a backplane on a side opposite to a backplane body according to an embodiment of the present disclosure.
Figure 3:
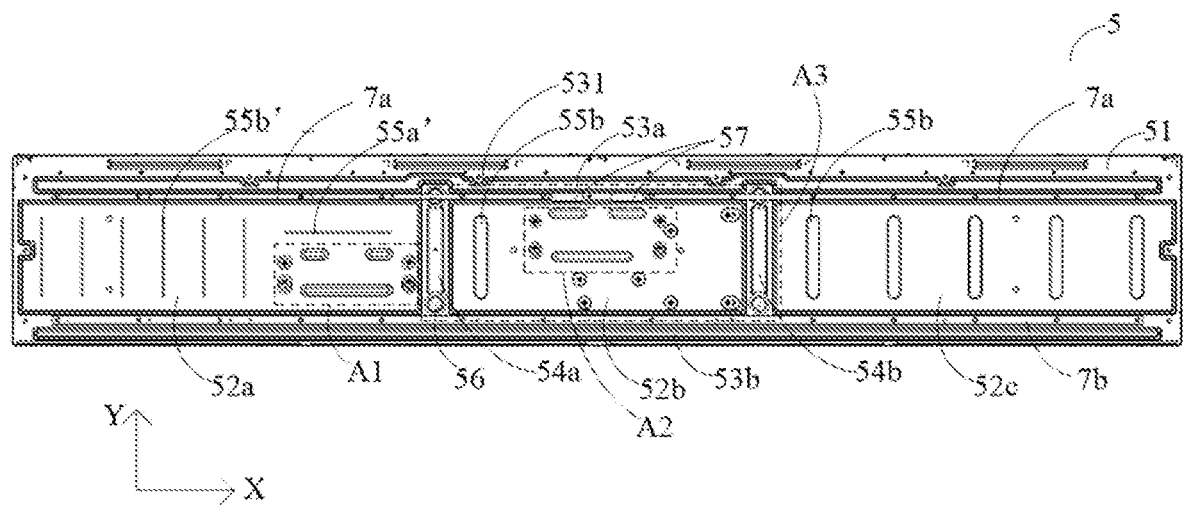
FIG. 3 is a schematic diagram of a structure of a backplane on a side opposite to a backplane body according to one specific embodiment of the present disclosure.

Referring to FIG. 2, the backplane 5 includes a backplane body 51 on a side of the backlight assembly 4 away from the display panel 2; the backplane body 51 has a contact structure recessed in a direction from a side away from the backlight assembly 4 toward a side close to the backlight assembly 4 (i.e., in a direction from outside to inside), and the contact structure contacts and supports the light guide assembly. In some alternative embodiments, a profile of a projection of the backplane body 51 on the plane where the light outgoing surface of the display panel 2 is located is a rectangle, which may include a rounded rectangle. It is understood that at least one of four corners of the rectangle is a rounded corner. The contact structure includes at least three contact sub-structures arranged at intervals along a direction parallel to a long side of the backplane body 51 (i.e., an X direction). For example, FIG. 3 shows three contact sub-structures (52a, 52b, 52c), each of which contacts and supports the backlight assembly 4. Specifically, any two adjacent contact sub-structures of the at least three contact sub-structures includes a spacing region therebetween, and any two adjacent contact sub-structures may be completely spaced apart by the spacing region, or may be designed to be connected to each other on at least one side of the spacing region. It should be noted that the number and the arrangement of the contact sub-structures may be freely set according to specific needs, which is not specifically limited by the embodiment of the present disclosure.

Specifically, a profile of the light outgoing surface of the display panel is rectangular or approximately rectangular; an orthographic projection of an outer profile of the display module on the plane where the light outgoing surface of the display panel is located may be rectangular or approximately rectangular; orthographic projections of an outer profile of the intermediate frame, an outer profile of the light guide plate and an outer profile of the optical film layer on the plane where the light outgoing surface of the display panel is located may be all rectangular or are all substantially rectangular. The rectangle may also include a rounded rectangle, i.e. at least one of the four corners of the rectangle is rounded.

In order to ensure heat dissipation, the backplane body 51 may be made of a material with good heat dissipation efficiency, such as aluminum or an aluminum alloy. In order to enhance a strength of the backplane body 51, the backplane body 51 further has a first reinforcing rib structure recessed in a direction from a side away from the light guide assembly toward a side close to the light guide assembly (i.e., from outside to inside), and the first reinforcing rib structure may be formed by punching from outside to inside, for example, with a punching depth of 6 mm. Specifically, the first reinforcing rib structure includes two first reinforcing ribs (53a, 53b) and at least two second reinforcing ribs. For example, FIG. 2 shows two second reinforcing ribs (54a, 54b), wherein the two first reinforcing ribs (53a, 53b) are respectively disposed on two sides of the at least three contact sub-structures close to two long sides of the backplane body 51, that is, are oppositely disposed on two sides of the at least three contact sub-structures in a Y direction, and the two first reinforcing ribs (53a, 53b) are both parallel to the long sides of the backplane body 51. In this way, the two first reinforcing ribs (53a, 53b) may reinforce the strength of the backplane body 51 in the direction parallel to the long side (i.e., the X direction), so that the display module may be prevented from being bent and deformed when two points on the display module are stressed in the long side direction. It should be noted that each of the first reinforcing ribs has a sufficient length. For example, two ends of each first reinforcing rib respectively extend to positions close to two short sides of the backplane body 51, so as to ensure that the strength of the backplane body 51 in a length direction is improved, thereby preventing the display module from being bent and deformed when two points on the display module are stressed in the long side direction. Specifically, each of the first reinforcing ribs may have a continuously extending structure, i.e., extending from one side of the backplane to the other side of the backplane in a direction parallel to the long side of the backplane; specifically, each of the first reinforcing ribs may have a segmented extending structure. For example, the first reinforcing rib includes a plurality of first reinforcing sub-ribs arranged from one side of the backplane to the other side of the backplane in a direction parallel to the long side, and all the first reinforcing sub-ribs have a same extending direction, and there is a space between any two adjacent first reinforcing sub-ribs, the plurality of first reinforcing sub-ribs may be arranged in a same straight line, or the plurality of first reinforcing sub-ribs may be arranged in at least two straight lines. In an embodiment, each of the first reinforcing ribs is of a continuously extending structure. In an embodiment, each of the first reinforcing ribs includes a plurality of first reinforcing sub-ribs arranged from one side of the backplane to the other side of the backplane in the direction parallel to the long side, and all the first reinforcing sub-ribs have the same extending direction, there is a space between any two adjacent first reinforcing sub-ribs, the plurality of first reinforcing sub-ribs may be arranged in at least two straight lines. For the first reinforcing sub-ribs arranged in one straight line, a space between any two adjacent first reinforcing sub-ribs is filled with the first reinforcing sub-rib arranged in the other straight line in a direction parallel to the short sides (i.e., the Y direction). The two solutions can better prevent the display module from being bent and deformed when two points on the display module are stressed in the long side direction.

In practical applications, sizes and locations of the two first reinforcing ribs ($53a$, $53b$) may be designed according to the specific spatial layout on the backplane body 51. For example, there is a difference between spatial sizes on the two sides of the contact region on the backplane body 51, because components such as a circuit board, flat cables, etc. are correspondingly provided on one side of the contact region of the backplane body 51, and in order to avoid mounting holes or other mounting structures for the components, such as flat cable holes 57 for the flat cables passing therethrough, a region on a side of the contact region of the backplane body 51 close to the flat cable holes 57 is narrower than that on the other side of the contact region, so that the two first reinforcing ribs ($53a$, $53b$) also have different widths. By taking a display module applied to the bar screen as an example, the display module has an outer profile length of 2171.08 mm, a width of 359.5 mm, a thickness of 9.29 mm (a thickness of the body), a thickness of 24.79 mm (a sum of the thickness of the body and a thickness of the timing controller and its protective cover), and a thickness of 26.29 mm (a sum of the thickness of the body and a thickness of the constant current board and its protective cover). In this case, the two first reinforcing ribs ($53a$, $53b$) have the same length, for example 2091 mm; a width of the first reinforcing rib $53a$ close to the flat cable holes 57 is 36.7 mm, and a width of the first reinforcing rib $53b$ away from the flat cable holes 57 is 24.1 mm.

As shown in FIG. 2, one second reinforcing rib is disposed in each of the spacing regions between every two adjacent contact sub-structures, and each of the second reinforcing ribs is located between two first reinforcing ribs ($53a$, $53b$) and is parallel to the short side of the backplane body 51, i.e., parallel to the Y direction. Both short sides of the backplane body 51 may be reinforced by means of the at least two second reinforcing ribs. The display module may be prevented from twisting and deforming in a diagonal direction by means of the at least two second reinforcing ribs parallel to the short sides of the backplane body 51. The first reinforcing rib structure is applied to the display screen with a super-long size (especially a bar screen), so that the strength of the backplane is significantly improved, and the display effect may be ensured.

In some alternative embodiments, a surface of the first reinforcing rib structure on a side of the backplane body 51 opposite to the backlight assembly 4 is flush with the contact sub-structures, so that the first reinforcing rib structure may contact the backlight assembly 4 and may be used for supporting together with the contact sub-structures.

In some alternative embodiments, in order to avoid holes, screws or other parts on the backplane body 51, at least one of the two first reinforcing ribs ($53a$, $53b$) is provided with a notch or has a partially bent shape. For example, as shown in FIG. 3, the first reinforcing rib $53a$ close to the flat cable holes 57 is provided with a plurality of notches 531. It is understood that when the first reinforcing rib is provided with a notch or has a partially bent shape, an overall shape of the first reinforcing rib may be considered as being parallel to the long side of the backplane body 51.

In some alternative embodiments, as shown in FIG. 3, the three contact sub-structures ($52a$, $52b$, $52c$) may be divided according to positions of four rivets 56. That is, the three contact sub-structures are respectively located at a left side, an inner side and a right side of a complete machine installation region A3 defined by the four rivets 56. The rivets 56 are used for the complete machine installation by the user. Alternatively, by taking the display module applied to the bar screen as an example, the middle contact sub-structure $52b$ is a rectangle with a length of 600 mm×a width of 200 mm, for example. In addition, the constant current board and its protective cover are mounted on a side of the backplane body 51 away from the backlight assembly 4 and located in a region A1, the region A1 is located in the contact sub-structure $52a$ on the left side; the timing controller and its protective cover are mounted on the side of the backplane body 51 away from the backlight assembly 4 and located in a region A2, and the region A2 is located in the middle contact sub-structure $52b$. On this basis, in order to avoid the rivets 56, each of the two second reinforcing ribs ($54a$, $54b$) is located in a space between the two rivets 56 oppositely disposed in the Y direction. A length×width of the second reinforcing rib is, for example, 154 mm×30.2 mm, by taking the display module applied to the bar screen as an example.

In some alternative embodiments, in order to further enhance a strength of the local region of the backplane 5, a second reinforcing rib structure is disposed on the surface of the backplane body 51 opposite to the backlight assembly 4 and in the at least one contact sub-structure, and includes at least one third reinforcing rib, and/or at least one fourth reinforcing rib, wherein the third reinforcing rib is parallel to the long side of the backplane body 51 (i.e., parallel to the X direction); the fourth reinforcing rib is parallel to the short side of the backplane body 51 (i.e., parallel to the Y direction).

In practical applications, the design of the second reinforcing rib structure may be determined according to positions of the components in the circuit board assembly 6 and shapes and sizes of a blank region. For example, as shown in FIG. 3, the left contact region $52a$ includes the region A1 where the constant current board is located. On the premise of avoiding the region A1, an area of the blank region on the left side of the region A1 is larger. Six fourth reinforcing ribs $55b'$ may be disposed, but the embodiment of the present disclosure is not limited thereto, and a specific number of third reinforcing ribs $55a'$ may be disposed, or a specific number of third reinforcing ribs $55a'$ and a specific number of fourth reinforcing ribs $55b'$ may be disposed, and an area of the blank region on the upper side of the region A1 is smaller, and a size of the region A1 in the Y direction is narrower, and one third reinforcing rib 55a' may be disposed.

In some alternative embodiments, in the left side contact region 52a, at least one of the one third reinforcing rib 55a' and the six fourth reinforcing ribs 55b' is a groove formed on a surface of the contact sub-structure 52a close to the display panel 2, and the groove may be formed by etching. A secondary processing may be performed on the backplane 5 by using such processing method as a compromise solution after the backplane 5 is manufactured, so that the second reinforcing rib structure may be designed more flexibly. In addition, the grooves are formed on the surface of the contact sub-structure 52a in contact with the backlight assembly, which may ensure the aesthetic of the outer surface of the backplane and prevent the outer surface of the backplane from being unsmooth and scratching hands of the user.

In some alternative embodiments, the six fourth reinforcing ribs 55b' have the same length, width and depth. For example, by taking the display module applied to the bar screen as an example, the length is 146 mm, the width is 3 mm, the depth is 0.2 mm, and a distance between any two adjacent fourth reinforcing ribs 55b' is 75 mm. The third reinforcing rib 55a' has a length of, for example, 200 mm, a width of, for example, 3 mm, and a depth of, for example, 0.2 mm.

The middle contact sub-structure 52b includes the region A2 where the timing controller is located, and on the premise of avoiding the region A2, one fourth reinforcing rib 55b is provided, and is recessed, for example, in a direction from a side opposite to the backlight assembly 4 toward a side away from the backlight assembly 4, that is, the direction where the fourth reinforcing rib 55b is recessed is opposite to the direction where the first and second reinforcing ribs are recessed, so as to ensure that the first and second reinforcing ribs may contact the backlight assembly 4 without generating a step. By taking the display module applied to the bar screen as an example, the fourth reinforcing rib 55b in the middle contact sub-structure 52b has a length of 155 mm, for example, and a width of 25 mm, for example. The fourth reinforcing rib 55b in the middle contact sub-structure 52b may be formed by punching from inside to outside, for example, with a punching depth of 2 mm. Five fourth reinforcing ribs 55b are provided in the contact sub-structure 52c on the right side, for example, are recessed in a direction from a side opposite to the backlight assembly 4 toward a side away from the backlight assembly 4, that is, the direction where the fourth reinforcing ribs 55b are recessed is opposite to the direction where the first and second reinforcing ribs are recessed, so as to ensure that the first and second reinforcing ribs may contact the backlight assembly 4 without generating a step. The five fourth reinforcing ribs 55b in the contact sub-structure 52c have the same length, width and depth. By taking the display module applied to the bar screen as an example, for example, the length is 155 mm, the width is 25 mm, the punching depth is 2 mm, and a distance between any two adjacent fourth reinforcing ribs 55b is 150 mm.

It should be noted that in practical applications, for the contact sub-structure without components in the circuit board assembly 6 provided therein, the number, the arrangement and the manufacturing manner of the third reinforcing ribs and/or the fourth reinforcing ribs in the second reinforcing rib structure may be designed according to specific requirements, and for the contact sub-structure with components in the circuit board assembly 6 provided therein, the contact sub-structure may be designed according to the positions of the components in the circuit board assembly 6 and shapes and sizes of the blank region on the premise of avoiding the components, which is not particularly limited by the embodiment of the present disclosure.

In the display module provided by the embodiment of the present disclosure, the strength of the backplane may be improved on the local region with the help of the above second reinforcing rib structure, and a display screen with a super-long size (especially a bar screen) may be prevented from bending and deforming and/or twisting and deforming on the local region, further the display effect is ensured. In addition, the strength of the backplane may be improved in the whole and local aspects by combining the first reinforcing rib structure and the second reinforcing rib structure, so that the display screen may be effectively prevented from deforming.

In some alternative embodiments, to further improve the strength of the backplane, as shown in FIG. 3, there is a space between each of the two first reinforcing ribs (53a, 53b) and each contact sub-structure. For example, a space between the first reinforcing rib 53a close to the flat cable holes 57 and each contact sub-structure is a first space, and a space between the first reinforcing rib 53b away from the flat cable holes 57 and each contact sub-structure is a second space. In order to avoid components such as a circuit board, a flat cable, etc. provided on the backplane 5, the backplane 5 is narrower in a region close to the flat cable holes 57, so that a size of the first space is smaller than that of the second space. For example, by taking the display module applied to the bar screen as an example, the first space is 10.2 mm, and the second space is 23 mm. Moreover, a reinforcing rib plate 7a is arranged on a side of the backplane body 51 close to the backlight assembly 4 and positioned in the first space; a reinforcing rib plate 7b is provided on the side of the backplane body 51 close to the backlight assembly 4 and in the second space.

In some alternative embodiments, the reinforcing rib plates 7a and 7b are, for example, electrolytically galvanized steel sheets (EGI).

In some alternative embodiments, as shown in FIG. 3, there are two reinforcing rib plates 7a located in the first space, and a space is provided between the two reinforcing rib plates 7a, so as to reserve an avoiding space for the flat cable holes 57.

Figure 4A:
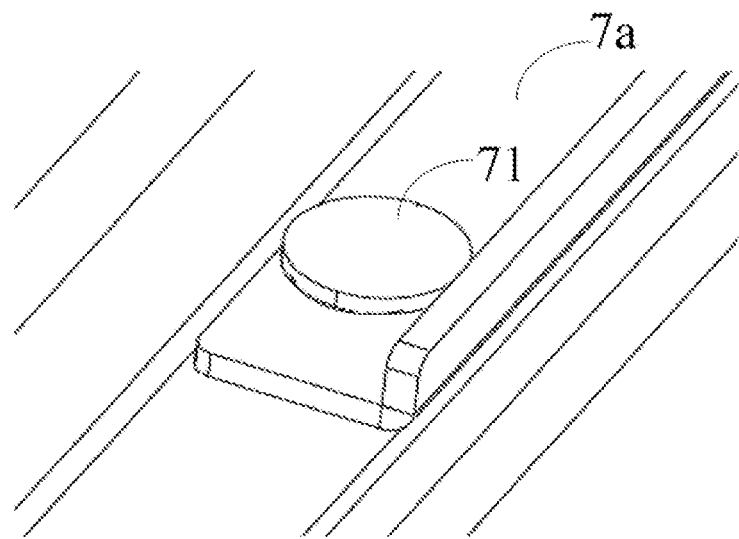
FIG. 4A is a partial view of a structure of a reinforcing rib plate according to an embodiment of the present disclosure.
Figure 4B:
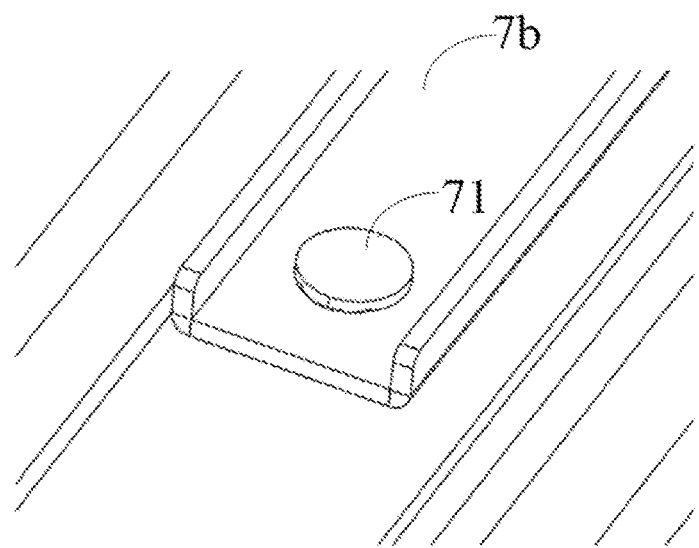
FIG. 4B is a partial view of a structure of another reinforcing rib plate according to an embodiment of the present disclosure.

In alternative embodiments, a cross-sectional shape and size of each reinforcing rib plate may be designed according to the first and second spaces to ensure that there is sufficient space for mounting screws on the reinforcing rib plates. In an embodiment, a cross-sectional shape of the reinforcing rib plate in a plane perpendicular to the light outgoing surface of the display panel 2 includes an L shape or a U shape, or the like. Specifically, as shown in FIG. 4A, the cross-sectional shape of each of the two reinforcing rib plates 7a located in the first space in the plane perpendicular to the light outgoing surface of the display panel 2 is L-shaped, because the first space is smaller, and under the same width, the screw mounting space on the L-shaped reinforcing rib plate is larger than that on the U-shaped reinforcing rib plate, so that sufficient space for mounting the screws 71 on the reinforcing rib plates 7a is ensured. Alternatively, by taking the display module applied to the bar screen as an example, each reinforcing rib plate 7a close to the flat cable holes 57 has a length of 920 mm, a width of 10.5 mm, and a thickness of 1.5 mm, for example; and each reinforcing rib plate 7a located in the first space is fixedly connected to the backplane body 51 by 7 screws 71, for example. Because the second space is relatively large, as shown in FIG. 4B, the cross-sectional shape of the reinforcing rib plates 7b located in the second space in the plane perpendicular to the light outgoing surface of the display panel 2 is U-shaped, and the reinforcing effect of the U-shaped reinforcing rib 7B is better. Alternatively, by taking the display module applied to the bar screen as an example, the reinforcing rib plate 7b in the second space has a length of 2020 mm, a width of 18 mm, and a thickness of 1.5 mm, for example; and the reinforcing rib plate 7b in the second space is fixedly connected to the backplane body 51 by 14 screws 71, for example.

Figure 5:
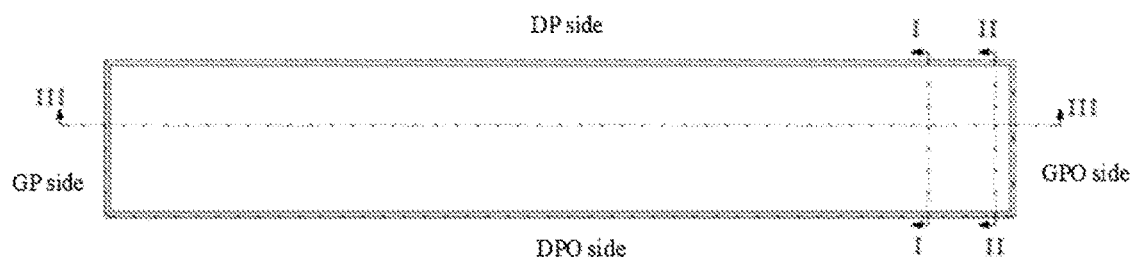
FIG. 5 is a top view of a display module according to an embodiment of the present disclosure.

In some alternative embodiments, FIG. 5 shows a case where the backlight module is placed in a landscape mode, and in an embodiment, a DPO side is a ground side; a DP side is a sky side, and a GP side and a GPO side are the left side and the right side, respectively. When the display module is placed in the landscape mode, namely, a long side of the display module is parallel to a placing plane of the display module, and the ground side (DPO side) refers to a side, facing the placing plane, of the display module when the display module is placed on the placing plane; the sky side (DP side) refers to a side of the display module away from the placing plane when the display module is placed on the placing plane. In an embodiment, the lateral backlight source 44 is located on the DPO side. The lateral backlight source 44 is located on the ground side of the display module so that a distance of the light guide plate away from the lateral backlight source 44 is kept constant under the gravity of the light guide plate, so as to ensure the display effect.

Figure 6:
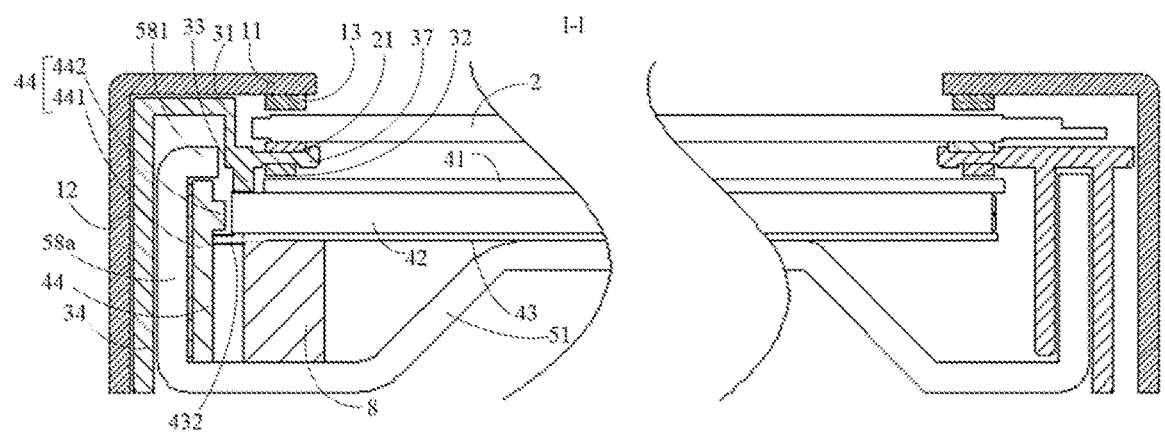
FIG. 6 is a cross-sectional view taken along a line I-I of FIG. 5.
Figure 7:
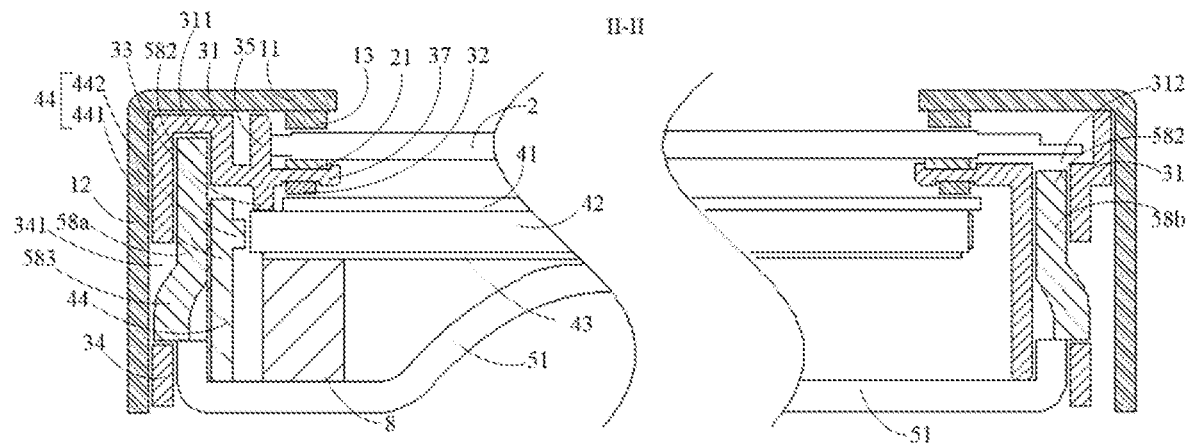
FIG. 7 is a cross-sectional view taken along a line II-II of FIG. 5.
Figure 8A:
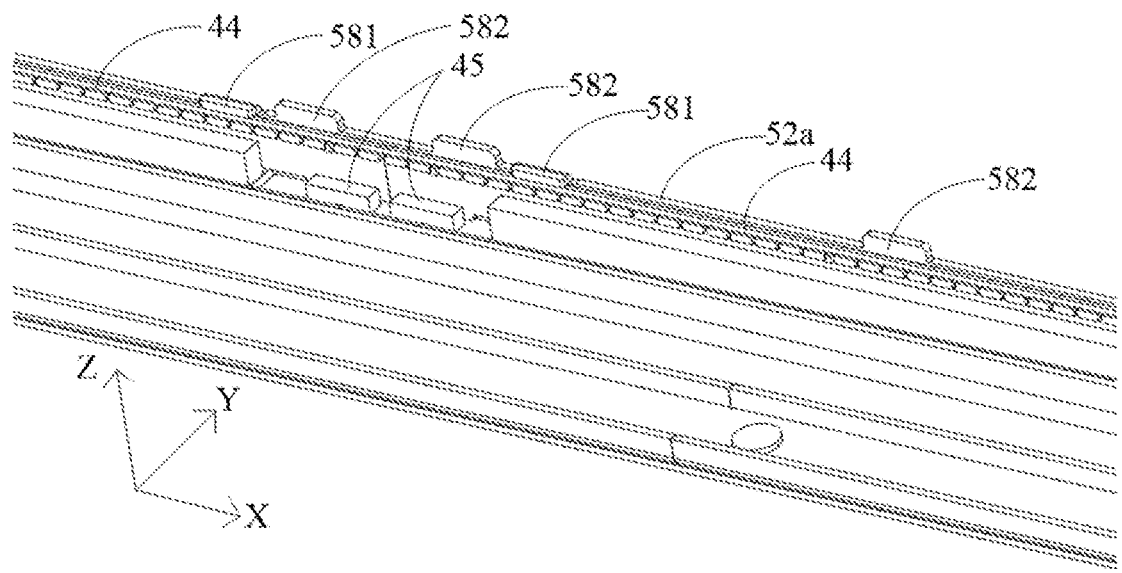
FIG. 8A is a partial view of a structure of a backplane on a side edge of a first backplane according to an embodiment of the present disclosure.

As shown in FIGS. 5 and 6, the backplane 5 further includes a first backplane side edge 58a located on a side of the lateral backlight source 44 away from the light guide plate 42, and in an embodiment, as shown in FIG. 7, the backplane 5 further includes a second backplane side edge 58b located on at least one side of the display module other than a side where the lateral backlight sources 44 are distributed, that is, the first backplane side edge 58a is located on the side where the lateral backlight sources 44 of the light guide plate 42 are distributed, and the second backplane side edge 58b is located on the side where the lateral backlight sources 44 of the light guide plate 42 are not distributed. As shown in FIG. 6 and FIG. 8A, at least one bent portion 581 is provided on the first backplane side edge 58a, and the bent portion 581 is bent from a side of the first backplane side edge 58a close to the lateral backlight source 44 towards a side of the display panel 2 opposite to the lateral backlight source 44, and partially overlaps the lateral backlight source 44. For example, the lateral backlight source 44 is located on a long side of the display module. For example, the number of the second backplane side edges 58b is 3, that is, the lateral backlight sources 44 are distributed on only one side of the light guide plate 42; for another example, the lateral backlight sources 44 may be distributed on two opposite sides of the light guide plate 42, where the number of the first backplane side edges 58a and the second backplane side edges 58b is 2, respectively. For example, a plurality of bent portions 581 may be provided on each first backplane side edge 58a.

The bent portion 581 may limit the lateral backlight source 44 in a Z direction. Further, the plurality of bent portions 581 are arranged at intervals along an extending direction of the first backplane side edge 58a, so that the lateral backlight source 44 may be aligned with the light guide plate 42 at each position in the extending direction of the first backplane side edge 58a, and the light leakage phenomenon may be avoided. For the display screen (especially the bar screen) with the super-long size (for example, more than 2 m), a misalignment is easy to occur between the lateral backlight source 44 and the light guide plate 42, which causes the light leakage. The above design may solve the misalignment between the lateral backlight source 44 and the light guide plate 42 well.

In some alternative embodiments, as shown in FIG. 5, the lateral backlight source 44 includes a printed circuit board 441 and an LED light bar 442 disposed on the printed circuit board 441, wherein the LED light bar 442 is disposed opposite to a light incident surface of the light guide plate 42. The printed circuit board 441 is adhered to a surface of the first backplane side edge 58a opposite to the printed circuit board 441. In addition, there may be a gap between the bent portion 581 and the printed circuit board 441 in the Z direction, so as to ensure that the lateral backlight source 44 is smoothly mounted.

In some alternative embodiments, as shown in FIG. 8A, the plurality of lateral backlight sources 44 are located on the same side of the light guide plate 42 and arranged in sequence in the extending direction (i.e., the X direction) of the first backplane side edge 58a, and every two adjacent lateral backlight sources 44 are electrically connected to each other through a light bar connector 45. In this case, at least one bent portion 581 is provided corresponding to each lateral backlight source 44. For example, four lateral backlight sources 44 are included, and four bent portions 581 are provided corresponding to each lateral backlight source 44. That is, there are sixteen bent portions 581.

In some alternative embodiments, as shown in FIG. 5 and FIG. 6, a receiving space is formed between the backplane body 51 and the light guide assembly and on a side of the contact structure close to the lateral backlight source 44, and the receiving space is provided with an elastic contact member 8, and the elastic contact member 8 is disposed in contact with the backplane body 51 and closely adjacent to the light guide assembly (i.e., there is no other component disposed between the elastic contact member 8 and the light guide assembly; for example, the elastic contact member 8 and the light guide assembly may or may not be in contact with each other, and when the elastic contact member 8 and the light guide assembly are not in contact with each other, air may be included between the elastic contact member 8 and the light guide assembly, that is, the elastic contact member 8 is adjacent to the light guide assembly immediately or otherwise, for example with or without a space (air) in-between.), so as to play a role of elastic support, so as to further prevent the light guide plate 42 from upwarping. In some alternative embodiments, the elastic contact member 8 may be made of rubber, for example. Alternatively, the elastic contact member 8 is flush with a surface where the at least three contact sub-structures are in contact with the backlight assembly 4.

In some alternative embodiments, the elastic contact member 8 may alternatively be disposed close to the backplane body 51 and in contact with the light guide assembly.

The display module further includes the intermediate frame 3, and the intermediate frame 3 includes an intermediate frame body 31 surrounding the backlight assembly 4. That is, the intermediate frame body 31 is distributed in a surrounding manner along a circumferential direction of the backlight assembly 4. It should be noted that the intermediate frame body 31 may be a continuous structure or a segmentally distributed structure. For example, when an outer profile of the backlight assembly 4 is rectangular or approximately rectangular, the intermediate frame body 31 is distributed in a surrounding manner along a circumferential direction of the backlight assembly 4, which may be understood as the intermediate frame body being distributed on four sides of the rectangle of the backlight assembly 4.

The intermediate frame 3 further includes a first limit protrusion 33 in contact with a surface of the light guide assembly close to the display panel 2, where the first limit protrusion 33 is adjacent to a surface of the light guide plate 42 close to the display panel 2 and on a side of the light guide plate 42 close to the lateral backlight source 44 (i.e., no other component is disposed between the light guide plate 42 and the first limit protrusion 33; for example, the light guide plate 42 and the first limit protrusion 33 may or may not be in contact with each other, and when the light guide plate 42 and the first limit protrusion 33 are not in contact with each other, air may be included between the light guide plate 42 and the first limit protrusion 33); the first limit protrusion 33 limits the light guide plate 42 together with the elastic contact member 8, so as to limit the light guide plate 42 together, to prevent the long side of the light guide plate 42 from upwarping, to improve the alignment of the light guide plate 42 and the lateral backlight source 44, and to ensure the display effect. In addition, the first limit protrusion 33 is also used for shielding light and preventing light emitted by the lateral backlight source 44 from leaking out of a non-display region.

In an embodiment, the number of the elastic contact members 8 located on the light source side is the same as that of the lateral backlight sources 44, and the elastic contact members are arranged corresponding to the lateral backlight sources 44, and a space is between any two adjacent elastic contact members 8 for avoiding a position where the LED light bars 442 are connected. For example, as shown in FIG. 8A, the light bar connectors 45 are avoided. By taking the display module applied to the bar screen as an example, the elastic contact member 8 has a length of 519 mm, a width of 4 mm, and a height of 6 mm.

Alternatively, a distance between the elastic contact member 8 on the light source side and the printed circuit board 441 in a direction perpendicular to a plane in which the printed circuit board extends may be in a range of 1 mm to 3 mm. Specifically, when the distance is less than or equal to 3 mm, the alignment accuracy between the light guide plate 42 and the LED light bar 422 may be effectively controlled. When the distance is greater than or equal to 1 mm, it facilitates to mount the lateral backlight sources 44 and/or the elastic contact members 8. In an embodiment, the distance is 1.5 mm.

In some alternative embodiments, the intermediate frame 3 further includes a first extension 37 located between the display panel 2 and the optical film layer 41, and used for supporting the display panel 2 and limiting the optical film layer 41, to prevent an edge of the optical film layer 41 from deforming and upwarping, so as to ensure the display effect.

In some alternative embodiments, as shown in FIGS. 5 and 6, a first buffer pad 32 may be further disposed between the first extension 37 and the backlight assembly 4 and be configured to buffer the light guide assembly, and thus, protect the light guide assembly, and the first buffer pad 32 may be, for example, a foam rubber, and may be adhered to the first extension 37. Similarly, a second buffer pad 21 may be further disposed between the first extension 37 and the display panel 2 and be configured to buffer the display panel 2, and thus, protect the display panel 2, and the second buffer pad 21 is, for example, a foam rubber, and may be adhered to the first extension 37.

Specifically, a distance between the first limit protrusion 33 and the light guide assembly in a direction perpendicular to a plane where the light outgoing surface of the display panel 2 is located is smaller than a distance between the first buffer pad 32 and the light guide assembly in the direction perpendicular to the plane where the light outgoing surface of the display panel 2 is located. Thus, the first limit protrusion 33 serves as a main limit function for the light guide assembly.

Specifically, a distance between the first limit protrusion 33 and the light guide plate 42 in the direction perpendicular to the plane where the light outgoing surface of the display panel 2 is located is smaller than a distance between the first buffer pad 32 and the optical film layer 41 in the direction perpendicular to the plane where the light outgoing surface of the display panel 2 is located, so that the first limit protrusion 33 may limit the light guide plate 42.

In some alternative embodiments, as shown in FIGS. 7 and 8A, a plurality of first recesses 311 are provided on a surface of the intermediate frame body 31 opposite to each of the first and second backplane side edges 58a, 58b; a plurality of first protrusions 582 are provided at the end of each of the first and second backplane side edges 58a, 58b opposite to the intermediate frame body 31; and each first protrusion 582 is correspondingly provided in each first recess 311. By matching each first protrusion 582 with each first recess 311, the intermediate frame 3 may be limited, and the intermediate frame 3 may be prevented from upwarping in the direction perpendicular to the light outgoing surface, so that the intermediate frame 3 is ensured to be not upwarping due to the limiting of the light guide plate 42 by the intermediate frame 3, and the alignment of the light guide plate 42 and the lateral backlight source 44 may be further improved. Specifically, the first backplane side edge 58a and the second backplane side edge 58b on the opposite side of the first backplane side edge 58a may have different numbers of first protrusions 582, respectively, to avoid that the intermediate frame 3 is installed backwards when installing. Specifically, by taking the display module applied to the bar screen as an example, 30 first protrusions 582 may be disposed on the first backplane side edge 58a, and 31 first protrusions 582 may be disposed on the second backplane side edge 58b (parallel to the long side) on a side opposite to the side where the first backplane side 58a is located; specifically, the remaining two second backplane side edges 58b (parallel to the short sides) may be provided with, for example, 7 first protrusions 582.

In some alternative embodiments, as shown in FIG. 7, each first recess 311 corresponding to each first protrusion 582 on the first backplane side edge 58a is a blind groove, that is, the first recess 311 does not penetrate through the intermediate frame body 31, so as to avoid light leakage; the second backplane side edge 58b is provided with a through groove 312, as the first recess, at a position corresponding to each first protrusion 582, and each first protrusion 582 on the second backplane side edge 58b is correspondingly disposed in each through groove 312. In this way, a bent portion for forming the blind groove may be omitted in the intermediate frame body 31 on the opposite side of the lateral backlight source 44. Compared with portions of the intermediate frame body 31 at the left and right sides (here, the left and right sides in the drawing are, for example, the ground side and the sky side, respectively) in FIG. 7, where the left side is the side where the lateral backlight source 44 is located, and the right side is a side opposite to the side where the lateral backlight source 44 is located, it may be known that the bent portion for forming the blind groove is omitted in the portion on the right side of the intermediate frame body 31 compared with the left side, so that the display panel 2 may be avoided, and the through groove 312 and the first protrusion 582 may have a sufficient fitting depth to ensure that the intermediate frame 3 is not upwarping.

In some alternative embodiments, the intermediate frame 3 further includes a second limit protrusion 35 located on a circumferential side of the display panel 2 and used for limiting the display panel 2. For example, as shown in FIG. 7, the second limit protrusion 35 is located on a side of the first recess 311 close to the light guide plate. Alternatively, the second limit protrusion 35 is provided, for example, at a position near a corner of the display panel 2. For example, four second limit protrusions 35 are respectively provided at positions near four corners of the display panel 2. It should be noted that according to specific requirements, the second limit protrusions 35 located on the opposite sides of the display panel 2 may or may not be oppositely disposed, that is, are staggered along the side of the display panel 2.

In some alternative embodiments, as shown in FIG. 7, the intermediate frame 3 further includes an intermediate frame side edge 34 located on a side of each of the first backplane side edge 58a and the second backplane side edge 58b away from the backlight assembly 4; the intermediate frame side edge 34 is provided with a plurality of clamping grooves 341 at intervals in an extending direction of the intermediate frame side edge 34; each clamping groove 341 penetrates through the intermediate frame side edge 34 along a direction perpendicular to the extending direction of the intermediate frame side edge 34; and each of the first backplane side edge 58a and the second backplane side edge 58b is provided with a plurality of hooks 583 at intervals in the extending direction thereof; each hook 583 is correspondingly clamped with each clamping groove 341 for preventing the intermediate frame 3 from upwarping. For the display screen with the ultra-long size (especially the bar screen with a length exceeding 1 m), the intermediate frame 3 is prone to be upwarping in the long side direction (i.e., the X direction). On the basis that the first protrusions 582 are matched with the first recesses 311, the plurality of hooks 583 are clamped with the plurality of clamping grooves 341, so that the upwarping of the intermediate frame 3 may be further avoided.

It should be noted that the embodiment of the present disclosure is not limited to the above case where the backplane side edge is clamped with the intermediate frame side edge by using the hooks and the clamping grooves. In practical application, any other clamping structure may also be used, which is not limited by the embodiment of the present disclosure.

In some alternative embodiments, as shown in FIG. 6, the frame 1 includes a frame body 11 located on a side of the first recess 311 away from the first protrusion 582 and extending along the direction parallel to the plane where the light outgoing surface of the display panel 2 is located, and a frame side edge 12 located on a side of each of the first and second backplane side edges 58a and 58b away from the backlight assembly 4. A surface of the frame body 11 and a surface of the intermediate frame body 31, which are opposite to each other, are attached to each other. In this way, a pressing force on the intermediate frame 3 may be increased, and the intermediate frame 3 may be further prevented from upwarping. In an embodiment, the frame side edge 12 is fixedly connected to each of the first and second backplane side edges 58a, 58b by fasteners.

For the display screen with the ultra-long size (especially the bar screen), for example, a display region of the display panel has a diagonal size greater than or equal to 48 inches, and a length-width ratio greater than or equal to 16:5, only the clamping connection between the frame 1 and the intermediate frame 3 cannot ensure that the frame 1 and the intermediate frame 3 are closely connected to each other. Thus, the frame side edge 12 is fixedly connected to each of the first backplane side edge 58a and the second backplane side edge 58b by the fasteners, so that the connection stability between the frame 1 and the intermediate frame 3 is enhanced, and the surface of the frame body 11 and the surface of the intermediate frame body 31, which are opposite to each other, are attached to each other. That is, a gap between the two surfaces is zero, so as to increase the pressing force on the intermediate frame 3, and further prevent the intermediate frame 3 from upwarping.

In a specific embodiment, the frame 1 is made of an electrolytically galvanized steel sheets (EGI), and the fasteners are 18 screws having a specification of M3.0×4, wherein the frame side edge 12 located on the short side of the frame 1 is provided with 2 screws with a distance of 210 mm, the frame side edge 12 located on the long side of the frame 1 is provided with 7 screws with a distance between any two adjacent screws of 376 mm. In this way, the strength of the frame 1 may be ensured and deformation for the frame 1 may be avoided.

In some alternative embodiments, as shown in FIG. 6, an orthographic projection of the frame body 11 on the plane where the light outgoing surface of the display panel 2 is located overlaps the light outgoing surface of the display panel 2, and a third buffer pad 13 may be further disposed between the frame body 11 and the display panel 2 and buffer the display panel 2, so as to protect the display panel 2 and avoid light leakage. The third buffer pad 13 is, for example, a foam rubber, and may be adhered to the frame body 11.

The display module provided by the embodiment of the present disclosure is directed to the display screen with the ultra-long size (especially the bar screen). For example, the display region of the display panel has the diagonal size greater than or equal to 48 inches, and the length-width ratio greater than or equal to 16:5, the bent portions 581 are provided on the first backplane side edge 58a, the elastic contact member 8 and the first extension 37 are used together to limit the light guide plate 42, the first protrusions 582 are provided on each of the first backplane side edge 58a and the second backplane side edge 58b, and the surface of the frame body 11 and the surface of the intermediate frame body 31, which are opposite to each other, are attached to each other, which are combined together to ensure that when the display module is applied to the display module with the ultra-long size, the lateral backlight source 44, the light guide plate 42, and the intermediate frame 3 do not have misalignment, upwarping, or the like, so that alignment of the light guide plate 42 and the lateral backlight source 44 may be improved, thereby ensuring the display effect.

In some alternative embodiments, the optical film layer 41 may generate thermal expansion when heated to reach a certain temperature. If an expansion amount is too large, the normal use of the display module may be affected. In order that a storage temperature for the display module satisfies a wide temperature use condition, that is, the display module may be normally used in a wide range of space environment temperature, and the storage temperature refers to a temperature of a space environment where the display module is placed. In addition, since an operating temperature of the display module does not generally exceed the storage temperature, the expansion amount of the optical film layer 41 may be calculated by using the storage temperature. Of course, the expansion amount of the optical film layer 41 may be calculated by using the operating temperature. For example, the operating temperature is greater than and equal to −20° C. and lower than and equal to 60° C.; or the operating temperature is greater than and equal to −30° C. and lower than and equal to 80° C. A first reserved expansion distance is provided between the optical film layer 41 and a component opposite to the optical film layer 41 in a direction parallel to the long side of the optical film layer 41. For example, as shown in FIG. 6, on the side of the optical film layer 41 where the lateral backlight source 44 is located, the first reserved expansion distance is provided between the optical film layer 41 and the first limit protrusion 33 (i.e., the component opposite to the optical film layer 41) on the first extension 37. A second reserved expansion distance is provided between the optical film layer 41 and a component opposite to the optical film layer 41 in a direction parallel to the short side of the optical film layer 41.

The first and second reserved expansion distances are distances between the optical film layer 41 and the components opposite to the optical film layer 41 at room temperature (25° C.), which should be equal to or greater than the thermal expansion amounts of the optical film layer 41 in the long side direction and the short side direction, respectively. Alternatively, the first reserved expansion distance and the second reserved expansion distance may be, for example, equal to or greater than the thermal expansion amounts of the optical film layer 41 in the long side direction and the short side direction thereof at the highest operating temperature of the display module, respectively. That is, even if the display module is used at the highest operating temperature of the display module (for example, 60° C. or 80° C.), the distance between the optical film layer 41 and the component opposite thereto may still be ensured to be equal to or greater than 0.

Similarly, in order that the operating temperature (or storage temperature) of the display module satisfies the wide temperature use condition, a third reserved expansion distance is provided between the light guide plate 42 and a component opposite to the light guide plate 42 in a direction parallel to the long side of the light guide plate 42; and a fourth reserved expansion distance is provided between the light guide plate 42 and a component opposite to the light guide plate 42 in a direction parallel to the short side of the light guide plate 42. For example, as shown in FIG. 6, on the side of the light guide plate 42 where the lateral backlight source 44 is located, the third reserved expansion distance is provided between the light guide plate 42 and the lateral backlight source 44 (i.e., the component opposite to the light guide plate 42).

The third and fourth reserved expansion distances are distances between the light guide plate 42 and the components opposite to the light guide plate 42 at room temperature (25° C.), which should be equal to or greater than the thermal expansion amounts of the light guide plate 42 in the long side direction and the short side direction, respectively. Alternatively, the third and fourth reserved expansion distances may be, for example, equal to or greater than the thermal expansion amounts of the light guide plate 42 in the long side direction and the short side direction thereof at the highest operating temperature of the display module, respectively. That is, even if the display module is used at the highest operating temperature of the display module (for example, 60° C. or 80° C.), the distance between the light guide plate 42 and the component opposite thereto may still be ensured to be equal to or greater than 0.

In some alternative embodiments, a projection of the light incident surface of the light guide plate 42 on a plane where the printed circuit board 441 is located is a first bar (e.g., a rectangular shape); and an orthographic projection of the LED light bar 442 on the plane where the printed circuit board 441 is located is a second bar (e.g., a rectangular shape). At room temperature (for example, 25° C.), a length of the first bar is greater than that of the second bar, and both ends of the first bar are closer to outer profile lines on two sides of the display module which are oppositely arranged in an extending direction of the first bar than both ends of the second bar, respectively; at the lowest storage temperature (for example, −20° C.) of the display module, the length of the first bar is greater than or equal to that of the second bar, and both ends of the second bar are not closer to the outer profile lines on the two sides of the display module oppositely arranged in the extending direction of the first bar than both ends of the first bar, respectively.

Figure 8B:
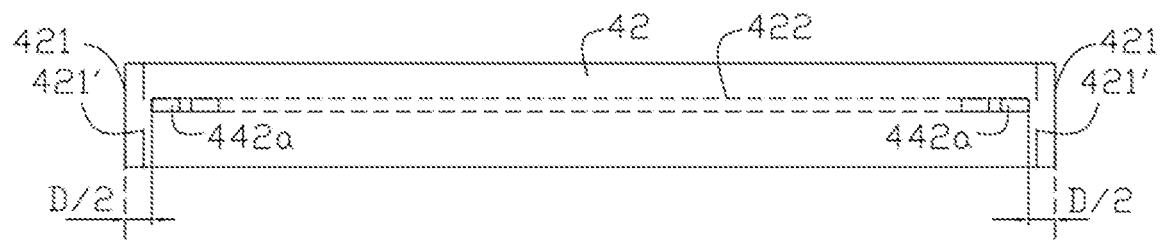
FIG. 8B is a schematic diagram of projections of a light guide plate and a portion of an LED lamp on a plane parallel to a light outgoing surface according to an embodiment of the present disclosure.

Specifically, as shown in FIG. 8B, the solid line block is the projection of the light incident surface of the light guide plate 42 on the plane where the printed circuit board 441 is located, i.e., the first bar; the dotted line block is the orthographic projection of the LED light bar 442 on the plane where the printed circuit board 441 is located, i.e. the second bar. At room temperature (for example, 25° C.), the length of the first bar is greater than that of the second bar, and the two ends of the first bar are closer to the outer profile lines on the two sides of the display module oppositely arranged in the extending direction of the first bar than the two ends of the second bar, respectively. Specifically, there is a length difference D between the length of the first bar and the length of the second bar, i.e., in FIG. 8B, there is a distance D/2 between the left end of the first bar and the left end of the second bar, and there is a distance D/2 between the right end of the first bar and the right end of the second bar. At the lowest operating temperature (for example, −20° C. or −30° C.) of the display module, the two ends of the first bar are retracted from original positions 421 to positions 421', at this time, the length of the first bar (i.e., the length of the two ends at the positions 421') is greater than or equal to the length of the second bar (a distance between two LED lamps 422a closest to the two ends of the first bar); and the two ends of the second bar are not closer to the outer profile lines on the two sides of the display module, which are oppositely arranged in the extending direction of the first bar, than the two ends of the first bar, respectively. Thus, at the lowest operating temperature (for example, −20° C. or −30° C.), when the light guide plate 42 is contracted from two ends to the middle in the long side direction, it is ensured that the two ends of the second bar do not protrude from two ends of the first bar towards a direction close to the outer profile lines on two sides of the display module all the time, so that the light leakage caused by the protruding of the LED light bar may be avoided, and the storage temperature of the display module may meet the wide temperature use condition.

In some alternative embodiments, the length difference D between the length of the first bar and the length of the second bar at room temperature (25° C.) may satisfy the following relationship:

$$D \geq 1.1 \times S_{guide}$$

where $S_{guide}$ is a total contracting amount of the light guide plate 42 contracting from two ends to the middle of the light guide plate 42 in the extending direction of the first bar; the total contracting amount is equal to a product of a length of the light guide plate 42, a specified temperature difference and a thermal expansion coefficient; and the specified temperature difference is a difference between room temperature (25° C.) and the lowest operating temperature (for example, −20° C. or −30° C.) of the display module. For example, under the condition that the lowest operating temperature of the display module is −20° C., the length of the light guide plate 42 is 2151.68 mm, and the specified temperature difference is 25° C.−(−20° C.)=45° C.; the thermal expansion coefficient of the light guide plate 42 is $6\times10^{-5}(1/°$ C.). Thus, the following is calculated: $S_{guide}$ is 5.8 mm, and the distance D is greater than or equal to 5.8 mm×1.1=6.38 mm. In addition, in an embodiment, in order to avoid that a dark corner of the light guide plate 42 occurs due to the excessively large distance D and thus the display effect is affected, the distance D is less than or equal to 7 mm.

In some alternative embodiments, D is greater than or equal to $S_{guide}$, to meet extreme design requirements.

In an embodiment, $D \geq 1.2 \times S_{guide}$, to further ensure the display reliability of the display panel.

Figure 9:
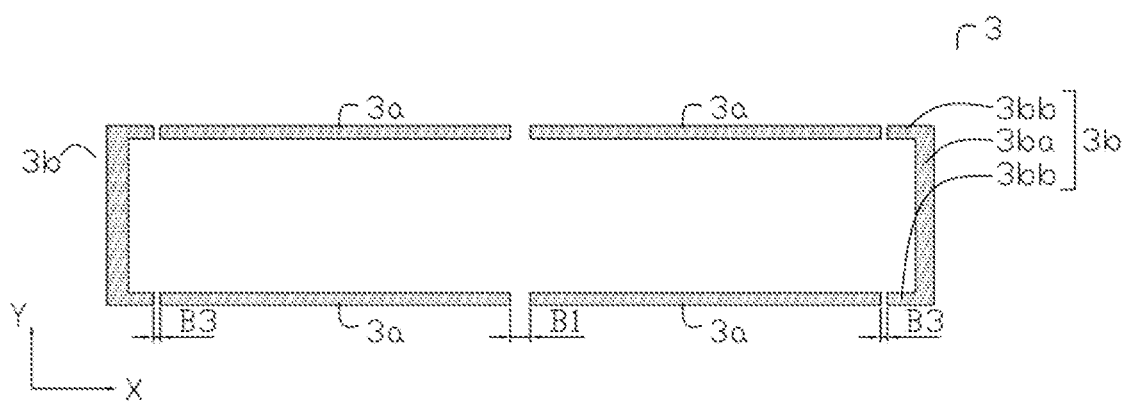
FIG. 9 is a schematic diagram of a layout of segments of an intermediate frame according to an embodiment of the present disclosure.

In some alternative embodiments, the intermediate frame 3 may generate thermal expansion when heated to reach a certain temperature. If an expansion amount is too large, the normal use of the display module may be affected. Thus, in order that the structural stability of the intermediate frame 3 is ensured and that the operating temperature (or storage temperature) for the display module satisfies a wide temperature use condition, as shown in FIG. 9, the intermediate frame 3 includes a plurality of segments sequentially stitched along a circumferential direction thereof, a space is provided between every two adjacent segments, and an end of a first one of the every two adjacent segments is provided with a first lapping portion extending in a direction close to the second one of the every two adjacent segments, and an end of the second one of the every two adjacent segments is provided with a second lapping portion extending in a direction close to the first one of the every two adjacent segments, and the second lapping portion overlaps the first lapping portion; a first stitching seam is provided between the first lapping portion and the end of the second one of the every two adjacent segments; a second stitching seam is provided between the second lapping portion and the end of the first one of the every two adjacent segments. By means of the first stitching seam and the second stitching seam, the following case may be avoided: when the intermediate frame is thermally expanded in the long side direction thereof during a temperature rises from room temperature to the highest operating temperature (for example, 60° C. or 80° C.) of the display module, the two adjacent segments are extruded at the stitched position, which causes the backplane 5 to bulge. The second lapping portion overlaps the first lapping portion, so that the following case may be avoided: when the intermediate frame 3 is contracted in the long side direction thereof during a temperature is lowered from room temperature to the lowest operating temperature (for example, −20° C. or −30° C.) of the display module, light leakage for the two adjacent segments occurs at the stitched position.

In a specific embodiment, as shown in FIG. 9, the outer profiles of the display panel 2 and the intermediate frame 3 are both rectangles, each of which may include a rounded rectangle, and it is understood that at least one of four corners of the rectangle is rounded. The segments include six segments, wherein four segments are straight line segments 3a, and the other two segments are fold-line segments 3b; two of the straight line segments 3a are located on one long side of the display panel 2, the other two straight line segments 3a are located on the other long side of the display panel 2, and the two straight line segments 3a on the same side are parallel to the long side (i.e., in the X direction) and are stitched with each other; each of the two fold-line segments 3b includes one first sub-segment 3ba and two second sub-segments 3bb, wherein the first sub-segment 3ba is located on one short side of the display panel 2 and is parallel to the short side, the two second sub-segments 3bb are respectively located on the two long sides of the display panel 2 and are respectively parallel to the two long sides, ends of the two second sub-segments 3bb are respectively connected to the two ends of the first sub-segment 3ba as a whole, and the other ends of the two second sub-segments 3bb are all stitched with the adjacent straight line segments 3a. The fold-line segment 3b is approximately U-shaped, which may improve the structural stability of the intermediate frame 3.

Figure 10A:
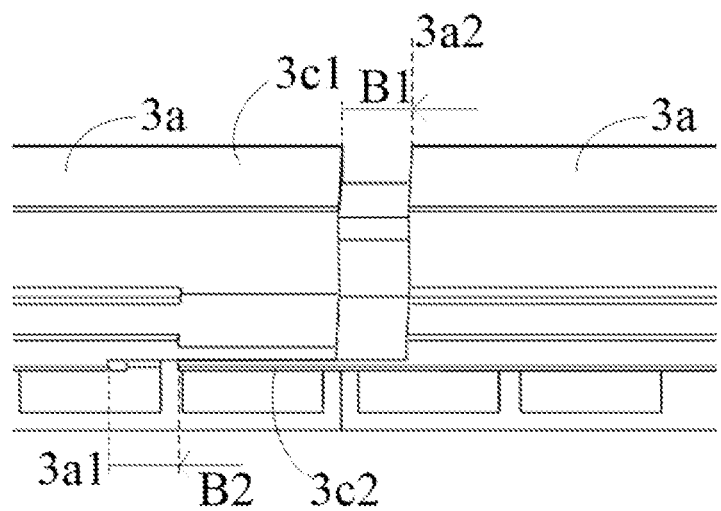
FIG. 10A is a partial view of a structure at a position where two adjacent straight line segments are stitched together according to an embodiment of the present disclosure.

For two adjacent straight line segments 3a, as shown in FIG. 10A, an end 3a1 of a first one (i.e., a left straight line segment 3a) of the two adjacent straight line segments 3a is provided with a first lapping portion 3d1 extending toward a direction close to a second straight line segment 3a (i.e., the right straight line segment 3a), and an end 3a2 of the second straight line segment 3a (i.e., the right straight line segment 3a) is provided with a second lapping portion 3c2 extending toward a direction close to the first straight line segment 3a (i.e., the left straight line segment 3a), the second lapping portion 3c2 and the first lapping portion 3d1 overlap with each other; a first stitching seam B1 between the first lapping portion 3d1 and the end 3a2 of the second straight line segment 3a (i.e., the right straight line segment 3a); a second stitching seam B2 between the second lapping portion 3c2 and the end 3a1 of the first straight line segment 3a (i.e., the left straight line segment 3a). Widths of the first stitching seam B1 and the second stitching seam B2 may be the same or different.

Figure 10B:
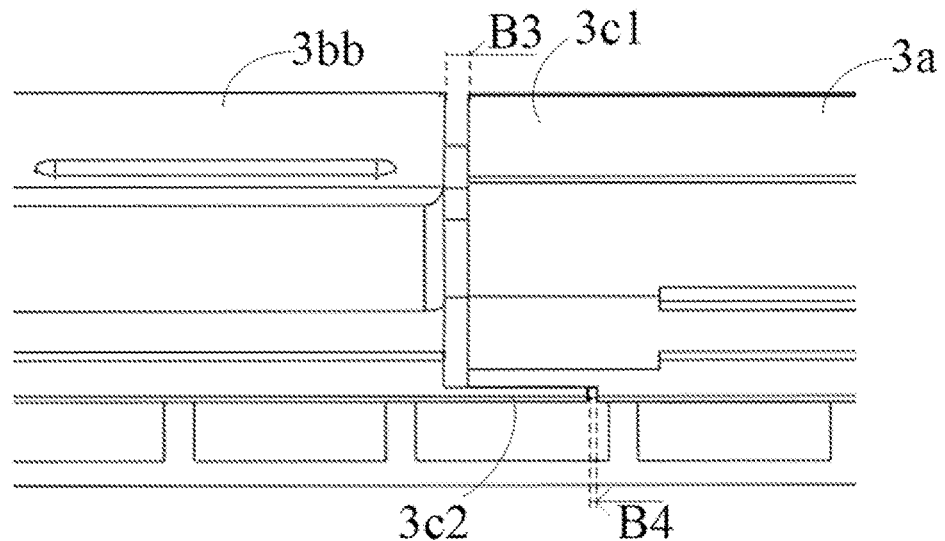
FIG. 10B is a partial view of a structure at a position where a second sub-segment and a straight line segment adjacent to the second sub-segment are stitched together according to an embodiment of the present disclosure.
Figure 11A:
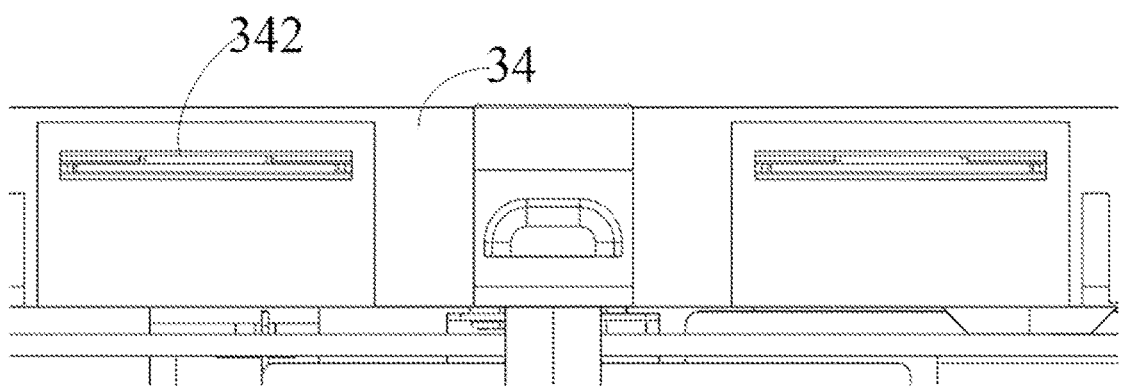
FIG. 11A is a partial view of a structure of a side of an intermediate frame at a second recess according to an embodiment of the present disclosure.
Figure 11B:
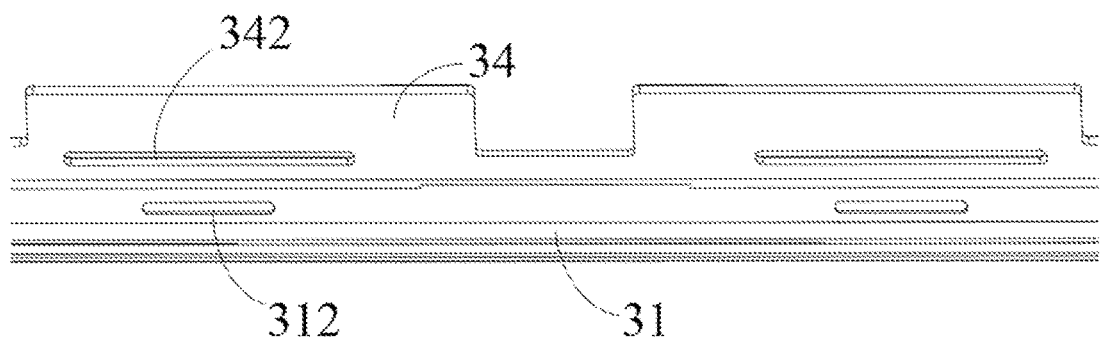
FIG. 11B is a partial view of a structure of an intermediate frame at a first recess and a second recess according to an embodiment of the present disclosure.

For the second sub-segment 3bb and the adjacent straight line segment 3a, as shown in FIG. 10B, an end of a first one (i.e., the straight line segment 3a) of the second sub-segment 3bb and the adjacent straight line segment 3a is provided with a first lapping portion 3d1 extending toward a direction close to a second one (i.e., the second sub-segment 3bb) of the second sub-segment 3bb and the adjacent straight line segment 3a; an end of the second one (i.e., the second sub-segment 3bb) of the second sub-segment 3bb and the adjacent straight line segment 3a is provided with a second lapping portion 3c2 extending toward a direction close to the first one (i.e., the straight line segment 3a) of the second sub-segment 3bb and the adjacent straight line segment 3a; the second lapping portion 3c2 and the first lapping portion 3d1 overlap with each other; a first stitching seam B3 between the first lapping portion 3d1 and the end of the second one (i.e., the second sub-segment 3bb) of the second sub-segment 3bb and the adjacent straight line segment 3a; a second stitching seam B4 between the second lapping portion 3c2 and the end of the first one (i.e., the straight line segment 3a) of the second sub-segment 3bb and the adjacent straight line segment 3a. Widths of the first stitching seam B3 and the second stitching seam B4 may be the same or different.

In some alternative embodiments, the width of each of the first and second stitching seam B1 and B2 between two straight line segments 3a on the same side is greater than the width of each of the first and second stitching seam B3 and B4 between the second sub-segment 3bb and the adjacent straight line segment 3a. Since the total width of the stitching seams on the same long side may be calculated, on this basis, the width of the first stitching seam B3 between the second sub-segment 3bb and the adjacent straight line segment 3a may be set to satisfy the assembly tolerance, and then the difference between the total width of the stitching seams and the width of the first stitching seam B3 between the second sub-segment 3bb and the adjacent straight line segment 3a, which acts as the width of the first stitching seam B1 between the two straight line segments 3a, is calculated. A lapping amount of the second lapping portion 3c2 and the first lapping portion 3d1 of the two straight line segments 3a on the same side in the extending direction thereof is greater than that of the second lapping portion 3c2 and the first lapping portion 3d1 of the second sub-segment 3bb and the adjacent straight line segment 3a in the extending direction thereof. The lapping amount is provided in a similar manner that the widths of the stitching seams width are provided.

In some alternative embodiments, for ensuring that the backplane 5 does not bulge due to extruding of the intermediate frame 3 at the stitched position when the intermediate frame is thermally expanded at the high temperature (e.g., 80° C.), the total width of the stitching seams of the intermediate frame 3 in the long side direction satisfies the following relationship:

$$B_{total} > 0.9 \times (G1 - G2)$$

where $B_{total}$ is the total width of the stitching seams of the intermediate frame 3 in the long side direction, and the total width of the stitching seams is equal to the sum of the width of the first stitching seam B1 between two straight line segments 3a in the long side direction of the intermediate frame 3 and the width of the first stitching seam B3 between each second sub-segment 3bb and the adjacent straight line segment 3a; G1 is a thermal expansion amount of the intermediate frame 3 in the long side direction during a temperature increases from room temperature to the highest operating temperature of the display module; G2 is a thermal expansion amount of the backplane 5 in the long side direction during a temperature increases from room temperature to the highest operating temperature of the display module.

In a specific embodiment, the intermediate frame 3 is made of polycarbonate (PC), has a thermal expansion coefficient of 0.00003 and a length of 2171.08 mm; the thermal expansion amount G1 of the intermediate frame 3 in the direction parallel to its long side is equal to a product of the length of the intermediate frame 3, the high temperature difference, and the thermal expansion coefficient of the intermediate frame 3; the high temperature difference is a difference between room temperature and the highest operating temperature of the display module. For example, the highest operating temperature of the display module is 80° C., room temperature is 25° C., thus, the high temperature difference is 55° C., so that the thermal expansion amount G1 of the intermediate frame 3 in the long side direction during a temperature increases from room temperature to the highest operating temperature of the display module may be 3.58 mm by calculation. The backplane 5 is made of aluminum, has a thermal expansion coefficient of 0.000023, and a length of 2171.08 mm; from this, it may be calculated: the thermal expansion amount G2 of the backplane 5 in the long side direction during a temperature increases from room temperature to the highest operating temperature of the display module is 2.75 mm, and further, it may be calculated: a difference is equal to 0.83 mm between the thermal expansion amount G1 of the intermediate frame 3 in the long side direction during a temperature increases from room temperature to the highest operating temperature of the display module and the thermal expansion amount G2 of the backplane 5 in the long side direction during a temperature increases from room temperature to the highest operating temperature of the display module. Each of the first and second stitching seam B1 and B2 between the two straight line segments 3a on the same side has a width of 1.5 mm, and each of the first and second stitching seam B3 and B4 between the second sub-segment 3bb and the adjacent straight line segment 3a has a width of 0.2 mm, whereby it may be calculated: the total width $B_{total}$ of the stitching seams of the intermediate frame 3 in the long side direction thereof is 1.9 mm, and is greater than 0.9×0.83 mm=1.89 mm, which may ensure that the backplane 5 does not bulge caused by extruding of the intermediate frame 3 at the stitched position at the high temperature.

In some alternative embodiments, $B_{total}$ is greater than (G1–G2) to meet extreme design requirements.

In an embodiment, $B_{total} > 0.95 \times (G1-G2)$, to further ensure the display reliability of the display panel.

In some alternative embodiments, for ensuring that light leakage for the intermediate frame does not occur at the stitched position when the intermediate frame is contracted at the low temperature, a minimum value of the lapping amount of each first lapping portion 3d1 and the corresponding second lapping portion 3c2, of the intermediate frame 3 in the long side direction of the intermediate frame, in the extending direction of the first lapping portion 3d1 and the corresponding second lapping portion 3c2, satisfies the following relationship:

$$Cmin > 1.1 \times S_{intermediate}$$

In consideration of the fact that a movement space of the intermediate frame 3 may be accumulated at one position, Cmin in the formula is the minimum value of the lapping amount, which is the minimum one of the lapping amount corresponding to two straight line segments 3a in the long side direction of the intermediate frame 3 and the lapping amount corresponding to each second sub-segment 3bb and the adjacent straight line segment 3a; and $S_{intermediate}$ is a contracting amount of the intermediate frame 3 in the long side direction during a temperature is lowered from room temperature to the lowest operating temperature of the display module.

Specifically, the contracting amount of the intermediate frame 3 in the direction parallel to the long side thereof is equal to a product of the length of the intermediate frame 3, a low temperature difference, and the thermal expansion coefficient of the intermediate frame 3; the low temperature difference is a difference between room temperature and the lowest operating temperature of the display module. For example, the lowest operating temperature of the display module is −20° C., room temperature is 25° C., and thus, the low temperature difference is 45° C., so that the contracting amount $S_{intermediate}$ of the intermediate frame 3 in the direction parallel to the long side thereof may be 2.93 mm by calculation. The lapping amount of the second lapping portion 3c2 and the first lapping portion 3d1 of the two straight line segments 3a on the same side in the extending direction is 4.5 mm, the lapping amount of the second lapping portion 3c2 and the first lapping portion 3d1 of the second sub-segment 3*bb* and the adjacent straight line segment 3*a* in the extending direction is 3.3 mm, and the minimum one of the above two lapping amounts is taken as the minimum value Cmin of the lapping amount. It may be known that the minimum value Cmin of the lapping amount of the intermediate frame 3 is 3.3 mm, which is greater than 1.1×2.93 mm=3.223 mm, which may ensure that during a temperature is lowered from room temperature to the lowest operating temperature of the display module, the second lapping portion 3*c*2 and the first lapping portion 3*d*1 may still be kept overlapping each other, and light leakage of two adjacent segments at the stitching position may be avoided.

In some alternative embodiments, Cmin is greater than $S_{intermediate}$, to meet extreme design requirements.

In an embodiment, Cmin>$1.2 \times S_{intermediate}$, to further ensure the display reliability of the display panel.

In some alternative embodiments, in order to reserve a certain thermal expansion distance between the optical film layer 41 and the intermediate frame side edge 34 opposite to the optical film layer, as shown in FIGS. 11A, 11B, 12A, 12B and 13, a plurality of third recesses 342 are provided on at least one intermediate frame side edge 34; a plurality of fourth recesses 583 are disposed on one of the first backplane side edge 58*a* and/or the second backplane side edge 58*b* corresponding to the intermediate frame side edge 34 provided with the third recesses 342; a plurality of fourth protrusions 411 are disposed on the side of the optical film layer 41 corresponding to the intermediate frame side edge 34 provided with the third recesses 342; and when the optical film layer 41 is thermally expanded, each of the fourth protrusions 411 may pass through the corresponding fourth recess 581 and extend into the corresponding third recess 342, so as to ensure that a sufficient expansion space is reserved for the optical film layer 41.

In an embodiment, the outer profiles of the display panel and the intermediate frame 3 are rectangular, and each third recess 342 is located on the short side corresponding to the rectangular outer profile formed by the intermediate frame 3. The optical film layer 41 has a greater expansion amount along the short side than the long side under a condition of the same increase in temperature, and the third recesses 342 are provided to reserve a sufficient expansion space for the optical film layer 41. Alternatively, the third recesses 342 may be located on the two short sides of the rectangular outer profile formed by the intermediate frame 3. Alternatively, the third recesses 342 may be located only on the two short sides corresponding to the rectangular outer profile formed by the intermediate frame 3, and not on the two long sides corresponding to the rectangular outer profile formed by the intermediate frame 3.

Figure 12A:
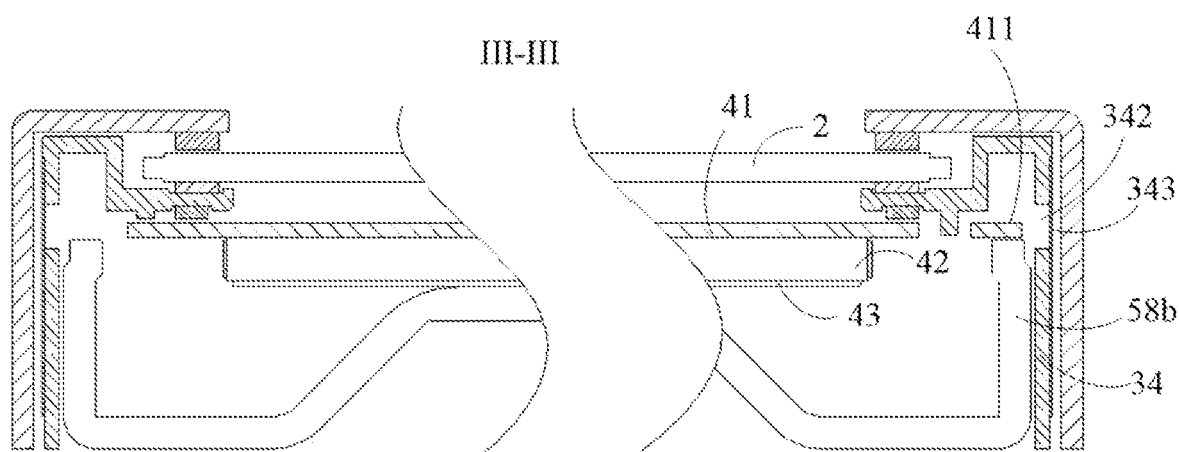
FIG. 12A is a cross-sectional view taken along a line III-III of FIG. 5.
Figure 12B:
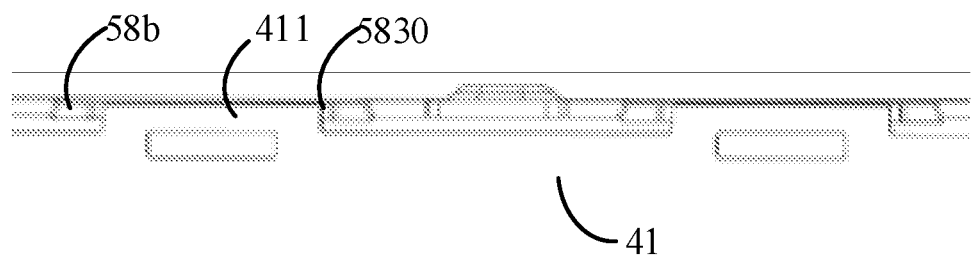
FIG. 12B is a partial top view of a positional relationship between an optical film layer and a side edge of a second backplane in FIG. 12A.
Figure 13:
FIG. 13 is a partial view of a structure of an optical film layer according to an embodiment of the present disclosure.

In some alternative embodiments, as shown in FIG. 12A, for example, each third recess 342 may be a through groove, to ensure that a sufficient thermal expansion distance is reserved for the optical film layer 41; and the display module further includes a light shielding member 343 located between the intermediate frame side edge 34 and the frame side edge 12 of the frame 1, for example, located on a surface of the intermediate frame side edge 34 away from the optical film layer 41. An orthographic projection of the light shielding member 343 on the intermediate frame side edge 34 covers the third recess 342, for avoiding light leakage. The light shielding member 343 is, for example, a light shielding tape.

Figure 14A:
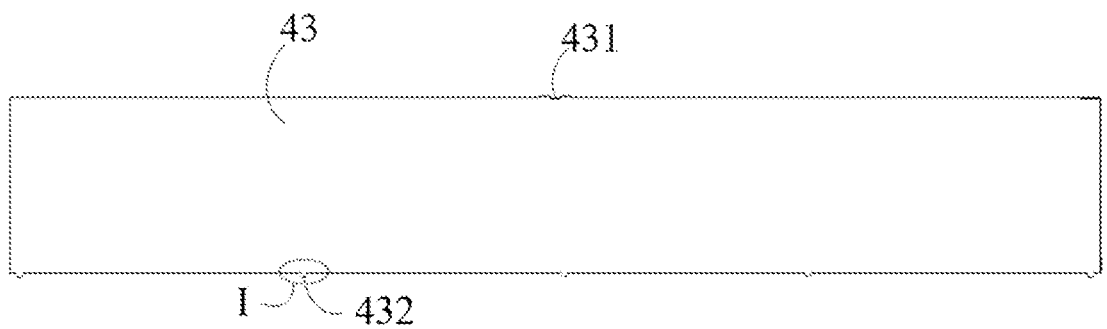
FIG. 14A is a schematic diagram of a structure of a reflector sheet according to an embodiment of the present disclosure.

In some alternative embodiments, in order to ensure that the reflective sheet 43 is not misaligned, as shown in FIG. 6 and FIG. 14A, a plurality of second protrusions 432 are provided on a side of the reflective sheet 43 opposite to the printed circuit board 441 of the lateral backlight source 44 and protrude toward the lateral backlight source 44, and are distributed at intervals along the side of the reflective sheet 43 opposite to the lateral backlight source 44, and one end of each second protrusion 432 opposite to the printed circuit board 441 is located under the LED light bar 442, for limiting the reflective sheet 43. In an embodiment, portions of the reflective sheet 43 other than the second protrusions 432 do not overlap the LED light bar 442 in a direction perpendicular to the light outgoing surface of the display panel 2.

In an embodiment, when the display module is placed in the landscape mode, namely, when a long side of the display module is parallel to a placing plane of the display module, the lateral backlight source 44 is located on the ground side of the display module. The ground side refers to a side, facing the placing plane, of the display module when the display module is placed on the placing plane.

In an embodiment, a surface of each second protrusion 432 opposite to the LED light bar 442 is covered with an anti-reflection layer capable of preventing light from reflecting, and for example, formed by printing with the black ink, to prevent bright spots on a picture caused by the second protrusion 432 reflecting light emitted from the LED light bar 442. With the second protrusion 432, the reflective sheet 43 may be limited, and it may be ensured that a body of the reflective sheet 43 does not shift to be under the LED light bar 442 due to misalignment, thereby avoiding bright spots on a picture, so that a black anti-reflection layer is not required to be formed on an edge of the body of the reflective sheet 43, and further, the process may be simplified, and the cost may be reduced.

Figure 14B:
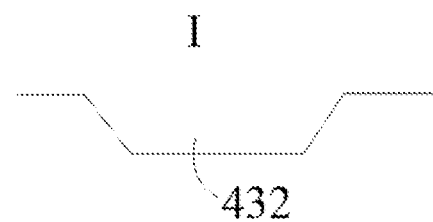
FIG. 14B is an enlarged view of a region I in FIG. 14A.

In some alternative embodiments, as shown in FIG. 14B, a length of the second protrusion 432 in a direction parallel to the side edge of the reflective sheet 43 opposite to the lateral backlight source 44 progressively decreases in a direction away from the side edge. In this way, the structural stability of the second protrusion 432 is improved, and thus, the second protrusion 432 is not easily bent. In one specific embodiment, the number of the second protrusions 432 is, for example, five, and the second protrusions are uniformly distributed along the side edge of the reflective sheet 43 opposite to the lateral backlight source 44; an orthographic projection of each second protrusion 432, on a plane parallel to a plane where the reflective sheet 43 is located, has a shape of, for example, an isosceles trapezoid, a length of a top edge of the isosceles trapezoid is 5 mm, a length of a bottom edge of the isosceles trapezoid is 10 mm, and a height of the isosceles trapezoid is 1.5 mm. Of course, in practical applications, the orthographic projection of each second protrusion 432, on the plane parallel to the plane where the reflective sheet 43 is located, may alternatively have the shape of any other shape, such as a rectangle.

In some alternative embodiments, in order to limit the backplane 5 and the reflective sheet 43, as shown in FIG. 14A, a second recess 431 is disposed on a side of the reflective sheet 43 away from the lateral backlight source 44, and a third protrusion (not shown) is disposed on a side edge of the backplane opposite to the second recess 431 and is located in the second recess 431. In an embodiment, the number of the second recess 431 may be one, and the second recess 431 is located at or near the middle of the side of the reflective sheet 43 away from the lateral backlight source 44, or a plurality of second recesses 431 may alternatively be included and distributed at intervals on the side of the reflective sheet 43 away from the lateral backlight source 44.

Alternatively, a length×a width of the second recess 431 may be, for example, 20.4 mm×4.7 mm.

In some alternative embodiments, the display module provided in the embodiments of the present disclosure is suitable for an ultra-long display screen (especially a bar screen with a length of more than 2 m). For example, the display region of the display panel 2 has the diagonal size greater than or equal to 48 inches, and the length-width ratio greater than or equal to 16:5.

To sum up, the display module provided by the embodiment of the present disclosure is directed to the display screen with the ultra-long size (especially the bar screen with the size of more than 2 m), the light leakage caused by the misalignment between the lateral backlight source and the light guide plate may be avoided by designing the alignment between the light guide plate and the lateral backlight source; it may be ensured that the optical film layer does not have the misalignment and side edges are not upwarping by designing the alignment between the optical film layer and the intermediate frame; the reflective sheet may be prevented from being misaligned by designing the alignment between the reflective sheet and the lateral backlight source and the backplane.

In some alternative embodiments, in the display module provided by the embodiment of the present disclosure, the strength of the backplane may be improved as a whole by using the first reinforcing rib structure, and the strength of the backplane may be locally improved by combining the second reinforcing rib structure, which may effectively improve the strength of the backplane, so that the ultra-long display screen (especially the bar screen) may be prevented from bending and deforming and twisting and deforming, and the display effect may be ensured.

In some alternative embodiments, in the display module provided by the embodiment of the present disclosure, the normal use of the display module may be still ensured when the optical film layer and the light guide plate are thermally expanded by designing the thermal expansion distance of at least one of the optical film layer and the light guide plate, so that the storage temperature of the display module may meet the wide temperature use condition. In addition, in order that the structural stability of the intermediate frame is ensured and that the storage temperature of the display module meets the wide temperature use condition, the intermediate frame adopts the segmentation design; the following cases may be avoided by designing the widths of the stitching seams between the segments and the lapping amount of the lapping portions: when the intermediate frame is thermally expanded at the high temperature, the two adjacent segments are extruded at the stitched position, which causes the backplane to bulge; and the light leakage for the two adjacent segments occurs at the stitched position at the low temperature.

As another technical solution, an embodiment of the present disclosure further provides a display apparatus, which includes the display module provided in the embodiment of the present disclosure, where the display module is a bar display module, that is, a length-width ratio of a display region is greater than 1. For example, the length-width ratio of the display region of the display panel 2 is greater than or equal to 16:5. Specifically, for example, a diagonal size of the display region of the display panel 2 is equal to 48 inches, the length-width ratio of the display region of the display panel 2 is equal to 16:3, and a resolution of the display region of the display panel 2 is 3840×720. For example, the diagonal size of the display region of the display panel 2 is equal to 47.1 inches, the length-width ratio of the display region of the display panel 2 is equal to 24:1, and the resolution of the display region of the display panel 2 is 3840×160. For example, the diagonal size of the display region of the display panel 2 is equal to 36.6 inches, the length-width ratio of the display region of the display panel 2 is equal to 16:2.4, and the resolution of the display region of the display panel 2 is 1920×290. For example, the diagonal size of the display region of the display panel 2 is equal to 35 inches, the length-width ratio of the display region of the display panel 2 is equal to 18:1, and the resolution of the display region of the display panel 2 is 2880×160.

An embodiment of the present disclosure further provides a display apparatus, which may improve the alignment of the light guide plate and the lateral backlight source by using the display module provided by the embodiment of the present disclosure, so as to ensure the display effect, and the display apparatus is particularly suitable for the display screen with the ultra-long size (especially the bar screen with the length of more than 2 m, for example).

The display apparatus provided by the embodiment of the present disclosure may be applied to the intelligent transportation system field such as public transportation, subway, etc., for example, may be applied to a display for a shield gate in the subway and a display for a semi-outdoor station board, so as to facilitate the passenger to watch information such as stations of the subway, and improve the passenger riding experience. In addition, the display apparatus may also be applied to advertisement serving display in subway, public transportation or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display module, comprising a display panel, a backplane on a side away from a light outgoing surface of the display panel, and a backlight assembly between the display panel and the backplane,
    wherein the backlight assembly comprises a light guide assembly, the light guide assembly comprises an optical film layer, a light guide plate and a reflective sheet sequentially arranged along a direction away from the display panel, and the backlight assembly further comprises a lateral backlight source arranged opposite to the light guide plate; the backplane comprises a backplane body on a side of the backlight assembly away from the display panel;
    the backplane body comprises a contact structure recessed in a direction from a side away from the light guide assembly toward a side close to the light guide assembly, and the contact structure is in contact with the light guide assembly; a receiving space is between the backplane body and the light guide assembly and on a side of the contact structure close to the lateral backlight source; an elastic contact member is in the receiving space and is in contact with the backplane body and is closely adjacent to the light guide assembly; and
    the display module further comprises an intermediate frame; the intermediate frame comprises an intermediate frame body surrounding the backlight assembly; the intermediate frame further comprises a first limit protrusion adjacent to a surface of the light guide assembly close to the display panel; and the first limit protrusion coordinates with the elastic contact member to limit the light guide plate;

wherein the backplane further comprises a first backplane side edge on a side of the lateral backlight source away from the light guide plate; and the first backplane side edge is provided with a bent portion, which extends from the first backplane side edge to a side of the lateral backlight source away from the backplane body.

2. The display module according to claim 1, wherein the first limit protrusion is adjacent to a surface of the light guide plate close to the display panel and on a side of the light guide plate close to the lateral backlight source; and the intermediate frame further comprises a first extension between the display panel and the optical film layer, and configured to support the display panel and limit the optical film layer.

3. The display module according to claim 1, wherein the backplane further comprises a second backplane side edge on at least one side of the display module other than the side where the lateral backlight source is arranged; and a plurality of first recesses are on a surface of the intermediate frame body opposite to each of the first and second backplane side edges in a direction perpendicular to the light outgoing surface; and a plurality of first protrusions are at an end of each of the first backplane side edge and the second backplane side edge opposite to the intermediate frame body, and each of the plurality of first protrusions is in a corresponding first recess.

4. The display module according to claim 3, wherein each of the plurality of first recesses corresponding to the first protrusion on the first backplane side edge is a blind groove; and each of the plurality of first recesses corresponding to the first protrusion on the second backplane side edge is a through groove.

5. The display module according to claim 3, wherein the display module further comprises a frame; the frame comprises a frame body on a side of the first recess away from the first protrusion and extending along a direction parallel to a plane where the light outgoing surface of the display panel is located, and a frame side edge on a side of each of the first backplane side edge and the second backplane side edge away from the backlight assembly;

wherein a surface of the frame body and a surface of the intermediate frame body, which are opposite to each other, are attached to each other; and the frame side edge is fixedly connected to each of the first backplane side edge and the second backplane side edge by fasteners.

6. The display module according to claim 3, wherein the intermediate frame body comprises intermediate frame side edges on sides of both the first backplane side edge and the second backplane side edge away from the light guide assembly; a plurality of third recesses are arranged on at least one intermediate frame side edge of the intermediate frame side edges; a plurality of fourth recesses are arranged on one of the first backplane side edge and the second backplane side edge provided with the intermediate frame side edge with the third recesses; and a plurality of fourth protrusions are arranged on a side of the optical film layer corresponding to the intermediate frame side edge with the third recesses.

7. The display module according to claim 6, wherein each of the plurality of third recesses is a through groove; and the display module further comprises a light shielding member on a surface of the intermediate frame side edge away from the optical film layer; an orthographic projection of the light shielding member on the intermediate frame side edge covers the third recess.

8. The display module according to claim 1, wherein the lateral backlight source comprises a printed circuit board and an LED light bar on the printed circuit board; and a plurality of second protrusions are on a side of the reflective sheet opposite to the printed circuit board and protrude toward the lateral backlight source, and are distributed at intervals along the side of the reflective sheet opposite to the lateral backlight source; and one end of each of the plurality of second protrusions opposite to the printed circuit board is under the LED light bar.

9. The display module according to claim 8, wherein an outer surface of each of the plurality of second protrusions is covered with an anti-reflection layer.

10. The display module according to claim 8, wherein a second recess is on a side of the reflective sheet away from the lateral backlight source, and a third protrusion is on the backplane side edge opposite to the second recess, the third protrusion is in the second recess.

11. The display module according to claim 1, wherein a profile of a projection of the backplane body on a plane where the light outgoing surface of the display panel is located is rectangular;

the contact structure comprises at least three contact sub-structures arranged at intervals along a direction parallel to a long side of the backplane body; the backplane body further comprises a first reinforcing rib structure recessed in a direction from a side away from the light guide assembly toward a side close to the light guide assembly.

12. The display module according to claim 1, wherein the lateral backlight source comprises a printed circuit board and an LED light bar on the printed circuit board;

a projection of a light incident surface of the light guide plate on a plane where the printed circuit board is located is a first bar, and an orthographic projection of the LED light bar on the plane where the printed circuit board is located is a second bar;

at room temperature, a length of the first bar is greater than that of the second bar, and both ends of the first bar are closer to outer profile lines on two sides of the display module which are oppositely arranged in an extending direction of the first bar than both ends of the second bar, respectively; and at a lowest storage temperature of the display module, the length of the first bar is greater than or equal to that of the second bar, and both ends of the second bar are not closer to the outer profile lines on the two sides of the display module oppositely arranged in the extending direction of the first bar than both ends of the first bar, respectively, wherein a length difference D between the length of the first bar and the length of the second bar at room temperature satisfies the following relationship:

$$D \geq 1.1 \times S_{guide}$$

where $S_{guide}$ is a total contracting amount of the light guide plate contracting from two ends to the middle of the light guide plate in the extending direction of the first bar; the total contracting amount is equal to a product of a length of the light guide plate, a specified temperature difference and a thermal expansion coefficient; and the specified temperature difference is a difference between room temperature and the lowest operating temperature of the display module.

13. The display module according to claim 1, wherein the intermediate frame comprises a plurality of segments sequentially stitched along a circumferential direction thereof, a space is between every two adjacent segments, and an end of a first one of the every two adjacent segments is provided with a first lapping portion extending in a direction close to a second one of the every two adjacent segments, and an end of the second one of the every two adjacent segments is provided with a second lapping portion extending in a direction close to the first one of the every two adjacent segments, and the second lapping portion overlaps the first lapping portion; and
    a first stitching seam is between the first lapping portion and the end of the second one of the every two adjacent segments; and a second stitching seam is between the second lapping portion and the end of the first one of the every two adjacent segments.

14. The display module according to claim 13, wherein outer profiles of the display panel and the intermediate frame are both rectangular;
    the plurality of segments are six segments, wherein four segments are straight line segments, and the other two segments are fold-line segments;
    wherein two of the straight line segments are on one long side of the display panel, the other two straight line segments are on the other long side of the display panel, and the two straight line segments on a same side are parallel to the long side and are stitched with each other; and
    each of the two fold-line segments comprises one first sub-segment and two second sub-segments, wherein the first sub-segment is on a corresponding short side of the display panel and is parallel to the short side, the two second sub-segments are respectively on two long sides of the display panel and are respectively parallel to the two long sides; ends of the two second sub-segments are respectively connected to the two ends of the corresponding first sub-segment as a whole, and the other ends of the two second sub-segments are all stitched with the adjacent straight line segments.

15. The display module according to claim 14, wherein ensuring that the backplane does not bulge due to extruding of the intermediate frame at a stitched position when the intermediate frame is thermally expanded at a high temperature, a total width of stitching seams of the intermediate frame in a long side direction satisfies the following relationship:

$$B_{total} > 0.9 \times (G1 - G2)$$

where $B_{total}$ is the total width of the stitching seams of the intermediate frame in the long side direction, and the total width of the stitching seams is equal to a sum of a width of a first stitching seam between two straight line segments in the long side direction of the intermediate frame and a width of a first stitching seam between each second sub-segment and the adjacent straight line segment; G1 is a thermal expansion amount of the intermediate frame in the long side direction during a temperature increases from room temperature to the highest operating temperature of the display module; G2 is a thermal expansion amount of the backplane in the long side direction during a temperature increases from room temperature to the highest operating temperature of the display module.

16. The display module according to claim 14, wherein ensuring that light leakage for the intermediate frame does not occur at a stitched position when the intermediate frame is contracted at a low temperature, a minimum value of a lapping amount of each first lapping portion and the corresponding second lapping portion, of the intermediate frame in the long side direction of the intermediate frame, in the extending direction of the first lapping portion and the corresponding second lapping portion satisfies the following relationship:

$$Cmin > 1.1 \times S_{intermediate}$$

where Cmin is the minimum value of the lapping amount, which is a minimum one of a lapping amount corresponding to two straight line segments in a long side direction of the intermediate frame and a lapping amount corresponding to each second sub-segment and the adjacent straight line segment; and $S_{intermediate}$ is a contracting amount of the intermediate frame in the long side direction during a temperature is lowered from the room temperature to the lowest operating temperature of the display module.

17. The display module according to claim 1, wherein a display region of the display panel has a diagonal size of greater than or equal to 48 inches and a length-width ratio of greater than or equal to 16:5.

18. A display apparatus, comprising the display module according to claim 1, wherein the display module is a bar display module.

19. A display module, comprising a display panel, a backplane on a side away from a light outgoing surface of the display panel, and a backlight assembly between the display panel and the backplane,
    wherein the backlight assembly comprises a light guide assembly, the light guide assembly comprises an optical film layer, a light guide plate and a reflective sheet sequentially arranged along a direction away from the display panel, and the backlight assembly further comprises a lateral backlight source arranged opposite to the light guide plate; the backplane comprises a backplane body on a side of the backlight assembly away from the display panel;
    the backplane body comprises a contact structure recessed in a direction from a side away from the light guide assembly toward a side close to the light guide assembly, and the contact structure is in contact with the light guide assembly; a receiving space is between the backplane body and the light guide assembly and on a side of the contact structure close to the lateral backlight source; an elastic contact member is in the receiving space and is in contact with the backplane body and is closely adjacent to the light guide assembly; and
    the display module further comprises an intermediate frame; the intermediate frame comprises an intermediate frame body surrounding the backlight assembly; the intermediate frame further comprises a first limit protrusion adjacent to a surface of the light guide assembly close to the display panel; and the first limit protrusion coordinates with the elastic contact member to limit the light guide plate,
wherein the lateral backlight source comprises a printed circuit board and an LED light bar on the printed circuit board; and
a plurality of second protrusions are on a side of the reflective sheet opposite to the printed circuit board and protrude toward the lateral backlight source, and are distributed at intervals along the side of the reflective sheet opposite to the lateral backlight source; and one end of each of the plurality of second protrusions opposite to the printed circuit board is under the LED light bar.

20. A display module, comprising a display panel, a backplane on a side away from a light outgoing surface of the display panel, and a backlight assembly between the display panel and the backplane,
wherein the backlight assembly comprises a light guide assembly, the light guide assembly comprises an optical film layer, a light guide plate and a reflective sheet sequentially arranged along a direction away from the display panel, and the backlight assembly further comprises a lateral backlight source arranged opposite to the light guide plate; the backplane comprises a backplane body on a side of the backlight assembly away from the display panel;
the backplane body comprises a contact structure recessed in a direction from a side away from the light guide assembly toward a side close to the light guide assembly, and the contact structure is in contact with the light guide assembly; a receiving space is between the backplane body and the light guide assembly and on a side of the contact structure close to the lateral backlight source; an elastic contact member is in the receiving space and is in contact with the backplane body and is closely adjacent to the light guide assembly; and
the display module further comprises an intermediate frame; the intermediate frame comprises an intermediate frame body surrounding the backlight assembly; the intermediate frame further comprises a first limit protrusion adjacent to a surface of the light guide assembly close to the display panel; and the first limit protrusion coordinates with the elastic contact member to limit the light guide plate,
wherein the lateral backlight source comprises a printed circuit board and an LED light bar on the printed circuit board;
a projection of a light incident surface of the light guide plate on a plane where the printed circuit board is located is a first bar, and an orthographic projection of the LED light bar on the plane where the printed circuit board is located is a second bar;
at room temperature, a length of the first bar is greater than that of the second bar, and both ends of the first bar are closer to outer profile lines on two sides of the display module which are oppositely arranged in an extending direction of the first bar than both ends of the second bar, respectively; and
at a lowest storage temperature of the display module, the length of the first bar is greater than or equal to that of the second bar, and both ends of the second bar are not closer to the outer profile lines on the two sides of the display module oppositely arranged in the extending direction of the first bar than both ends of the first bar, respectively.

* * * * *